United States Patent
Yoon et al.

(10) Patent No.: US 10,431,004 B2
(45) Date of Patent: Oct. 1, 2019

(54) ELECTRONIC DEVICE AND METHOD FOR DISPLAYING EVENT IN VIRTUAL REALITY MODE

(71) Applicant: Samsung Electronics Co., Ltd., Suwon-si, Gyeonggi-do (KR)

(72) Inventors: Yeong-Seong Yoon, Seoul (KR); Sang-Won Kang, Suwon-si (KR); Jin-Goo Lee, Seoul (KR); Seong-Hoon Choi, Seoul (KR); Woo-Suk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 15/109,558

(22) PCT Filed: Jan. 6, 2015

(86) PCT No.: PCT/KR2015/000097
§ 371 (c)(1),
(2) Date: Jul. 1, 2016

(87) PCT Pub. No.: WO2015/102464
PCT Pub. Date: Jul. 9, 2015

(65) Prior Publication Data
US 2016/0335801 A1 Nov. 17, 2016

(30) Foreign Application Priority Data

Jan. 6, 2014 (KR) .................. 10-2014-0001552
Jan. 5, 2015 (KR) .................. 10-2015-0000892

(51) Int. Cl.
*G06T 19/00* (2011.01)
*G09G 5/00* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC .. G09G 2370/16; G09G 5/006; G06T 19/006; G06T 2200/04; H04N 13/0429; G06F 3/0481
See application file for complete search history.

(56) References Cited

U.S. PATENT DOCUMENTS 9,349,183 B1 * 5/2016 Douglas .................. G06T 7/593
2009/0300122 A1 12/2009 Freer
(Continued)

FOREIGN PATENT DOCUMENTS

AU 2013 200 187 A1 1/2013
CN 103149669 A 6/2013
(Continued)

OTHER PUBLICATIONS

Chinese Office Action with English translation dated Sep. 5, 2018; Chinese Appln. 201580003868.X.
(Continued)

Primary Examiner — Tapas Mazumder
(74) Attorney, Agent, or Firm — Jefferson IP Law, LLP

(57) ABSTRACT

Various embodiments of the present invention may comprise: a display unit for displaying a screen corresponding to a virtual reality mode; and a control unit for sensing an interrupt due to occurrence of at least one event, changing event-related information related to the occurred event to a form corresponding to the virtual reality mode, and controlling the changed event-related information to be displayed on the screen operated corresponding to the virtual reality mode. In addition, other embodiments are possible for the various embodiments of the present invention.

16 Claims, 27 Drawing Sheets

(51) Int. Cl.
*H04N 13/332* (2018.01)
*G06F 3/01* (2006.01)
*G02B 27/01* (2006.01)
*G06F 3/0488* (2013.01)
*G06F 3/0484* (2013.01)
*G06F 3/0481* (2013.01)

(52) U.S. Cl.
CPC ........ *G06F 3/0481* (2013.01); *G06F 3/04842* (2013.01); *G06F 3/04883* (2013.01); *G09G 5/006* (2013.01); *H04N 13/332* (2018.05); *G02B 2027/014* (2013.01); *G02B 2027/0132* (2013.01); *G02B 2027/0136* (2013.01); *G06T 2200/04* (2013.01); *G09G 2370/16* (2013.01)

(56) References Cited

U.S. PATENT DOCUMENTS

| | | | | |
|---|---|---|---|---|
| 2011/0169927 A1* | 7/2011 | Mages | ................ | G06F 3/04815 348/51 |
| 2012/0302289 A1 | 11/2012 | Kang | | |
| 2013/0050432 A1 | 2/2013 | Perez et al. | | |
| 2013/0117377 A1 | 5/2013 | Miller | | |
| 2013/0147849 A1* | 6/2013 | Kwak | ...................... | G09G 5/14 345/666 |
| 2013/0163089 A1 | 6/2013 | Bohn | | |
| 2014/0085316 A1* | 3/2014 | Narayanan | ............. | H04N 7/157 345/501 |
| 2014/0364212 A1* | 12/2014 | Osman | .................. | A63F 13/213 463/31 |

FOREIGN PATENT DOCUMENTS

| | | |
|---|---|---|
| GB | 2477787 A | 8/2011 |
| KR | 2013-0005108 A | 1/2013 |
| WO | 2013-052855 A2 | 4/2013 |

OTHER PUBLICATIONS

European Search Report dated Aug. 10, 2017; European Appln. No. 15733319.6-1902/3093743.

* cited by examiner

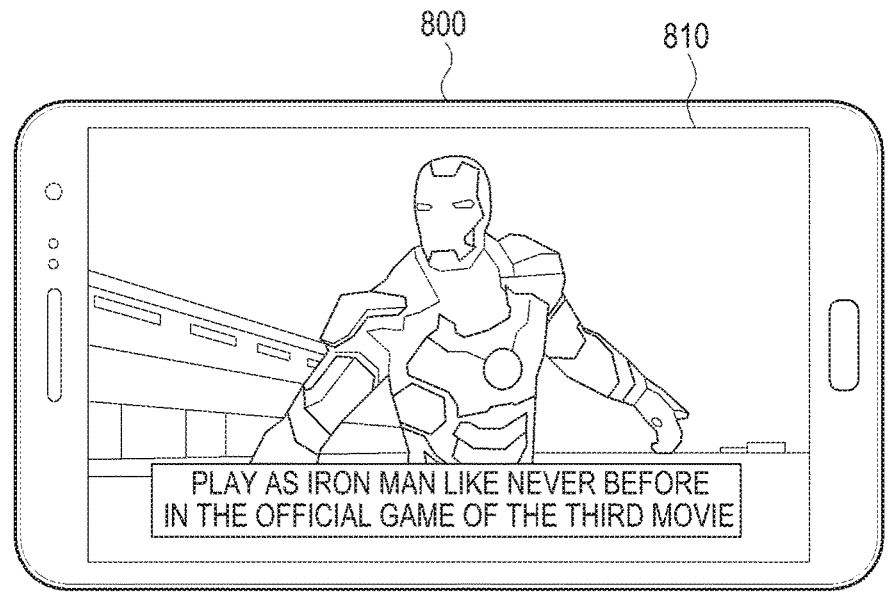
NORMAL MODE
↓ EVENT OCCURS
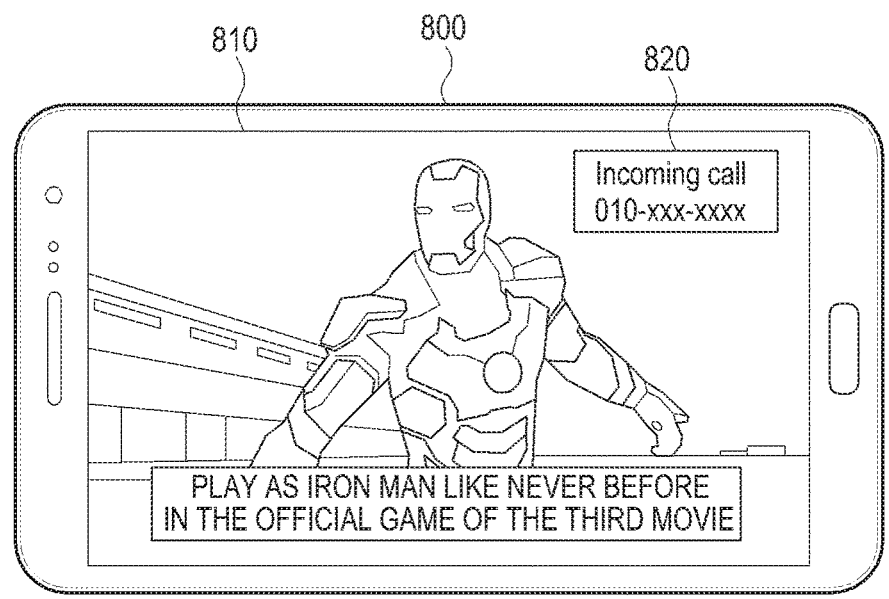
NORMAL MODE
FIG.8

ELECTRONIC DEVICE AND METHOD FOR DISPLAYING EVENT IN VIRTUAL REALITY MODE

PRIORITY

This application is a National Phase Entry of PCT International Application No. PCT/KR2015/000097, which was filed on Jan. 6, 2015, and claims a priority to Korean Patent Application No. 10-2014-0001552, which was filed on Jan. 6, 2014, and claims a priority to Korean Patent Application No. 10-2015-0000892, which was filed on Jan. 5, 2015, the contents of which are incorporated herein by reference.

DETAILED DESCRIPTION OF THE INVENTION

Technical Field

Embodiments of the present invention relate to electronic devices and methods for displaying events in a virtual reality mode.

Background Art

Generally, virtual reality (VR) refers to an environment or circumstance similar to a real-life environment as created by computer graphics and means an interface allowing a human being to feel it through his sense organ as if he interacts with it. The user may interoperate with virtual reality in real-time through device manipulation and may have a similar sensory experience to that in the real world.

Augmented reality (AR) is part of virtual reality and is a computer graphic scheme that allows a virtual object to look present in the original environment by synthesizing the virtual object or information with the actual environment. Augmented reality (AR) is a technique showing the user an overlap of the virtual object on the real-life world the user sees with his eyes. It shows a single image obtained by mixing additional information and virtual world with the real world in real-time, and thus, it is also called mixed reality (MR).

Such virtual reality techniques may be easily or frequently encountered in various services, such as education, games, navigation, advertisements, or blog services as mobile devices (e.g., smartphones or tablet PCs) are commonplace. As wearable devices are commercially available, more research is underway on virtual reality technology.

For example, wearable devices are being provided in various types, e.g., head mounted type, glasses, watches, bands, contact lenses, rings, shoes, clothes, or other various ways to be worn on the human body or clothes. Such wearable devices allow electronic devices to be worn on clothes or glasses or other human body, leading to increased portability or accessibility.

Among various wearable devices, head mounted wearable devices, e.g., head mounted displays (HMD), are being intensively developed. A head mounted display (HMD) may provide images in a see-through type providing augmented reality (AR) and in a see-closed type providing virtual reality (VR).

The see-through type may synthesize or combine a virtual object or target with a real-life base using the characteristics of a semi-transmissive lens to reinforce additional information difficult to obtain only with the real world. The see-closed type places two displays ahead of the user's eyes and allows the user alone to view contents (games, movies, streaming, or broadcast) provided through an external input through an independent screen, so that the user may concentrate on the contents.

DISCLOSURE

Technical Problem

According to conventional art, e.g., when an interrupt occurs due to a particular event while the electronic device (e.g., a mobile phone) operates in the virtual reality mode, the application for the event is run separately from the virtual reality mode operation, interfering with the screen display according to the virtual reality mode.

Further, when the interrupt occurs while operating in the virtual reality mode, a notification for the event is displayed on a separate screen or displayed in 2D on the virtual reality mode screen, causing it not to go well with the virtual reality screen.

To address this, according to an embodiment of the present invention, there may be provided an electronic device and method for displaying an event in the virtual reality mode that, when an event occurs while operating in the virtual reality mode, may process and display the event to fit the virtual reality mode.

According to an embodiment of the present invention, there may be provided an electronic device and method for displaying an event in the virtual reality mode that, when an event occurs while operating in the virtual reality mode, may display, through the virtual reality screen, a notification method for the occurring event in a different way from that in a normal mode.

According to an embodiment of the present invention, there may be provided an electronic device and method for displaying an event in the virtual reality mode that, when an event occurs while operating in the virtual reality mode, may block the running of an application related to the event run by an existing operating system and process and display the occurring event to fit the virtual reality mode.

Technical Solution

To achieve the foregoing and other objects, according to an embodiment of the present invention, an electronic device may comprise a display unit displaying a screen corresponding to a virtual reality mode and a controller performing control to detect an interrupt according to occurrence of at least one event, vary event-related information related to the event in a form corresponding to the virtual reality mode, and display the varied event-related information on a screen run corresponding to the virtual reality mode.

According to an embodiment of the present invention, a method for displaying an event in the virtual reality mode may comprise running a virtual reality mode on the electronic device, detecting an interrupt according to occurrence of at least one event, varying event-related information related to the event in a form corresponding to the virtual reality mode, and displaying the varied event-related information on a screen run corresponding to the virtual reality mode.

Advantageous Effects

According to an embodiment of the present invention, by the electronic device and method for displaying an event in the virtual reality mode, when an interrupt occurs due to a particular event while operating in the virtual reality mode, the running of the application related to the event in the virtual reality mode may be blocked, and the event may be processed into a form appropriate for the virtual reality mode and notified, allowing the notification in the virtual reality mode to be displayed to the user in an efficient manner.

Further, according to an embodiment of the present invention, when an interrupt occurs due to a particular event while operating in the virtual reality mode, the event may be efficiently notified on the virtual reality mode while maximally reducing the capability of the electronic device.

BRIEF DESCRIPTION OF THE DRAWINGS

FIG. 8 is a view illustrating a screen for representing a method for displaying an event in a normal mode;

BEST MODE

Figure 1:
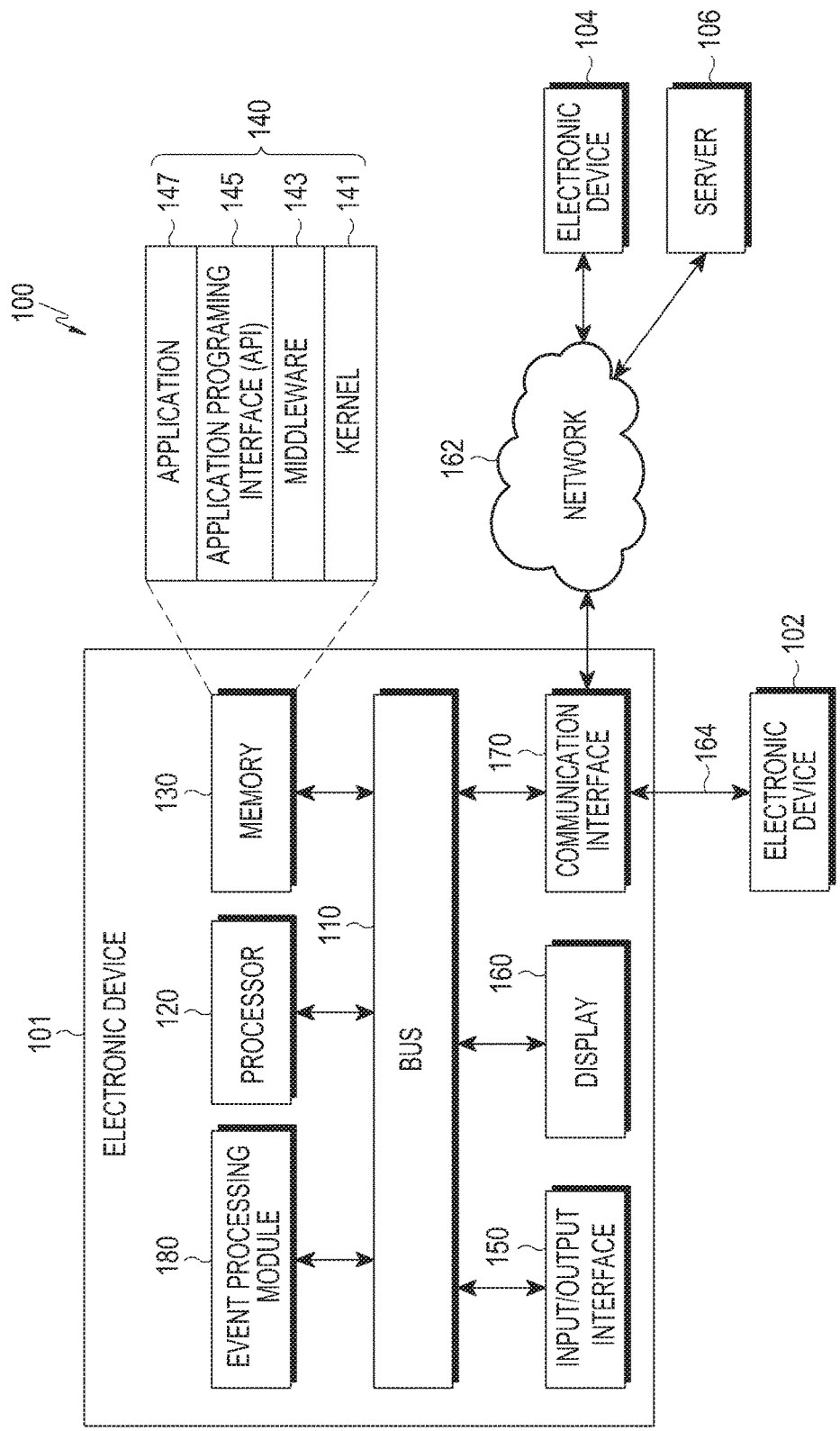
FIG. 1 is a view illustrating a network configuration according to an embodiment of the present invention.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present invention may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present invention, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present invention, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 may detect the mounting in the HMD and operate in a virtual reality mode. When the electronic device 101 is mounted in the electronic device 102 (e.g., the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present invention.

The server 106 may support to drive the electronic device 101 by performing at least one of operations (or functions) implemented on the electronic device 101. For example, the server 106 may include an event processing server module (not shown) that may support the event processing module 180 implemented in the electronic device 101. For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners.

For example, according to an embodiment of the present invention, the event processing module 180 may process information related to an event, which is generated while the electronic device 101 is mounted in a wearable device (e.g., the electronic device 102) to function as a display apparatus and to operate in the virtual reality mode, to fit the virtual reality mode and display the processed information. When the event generated while operating in the virtual reality mode is an event related to running an application, the event processing module 180 may block the running of the application or process the application to operate as a background. Additional information on the event processing module 180 may be provided through FIG. 2 described below.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present invention in interoperation with at least one program 140 stored in the memory 130.

Figure 2:
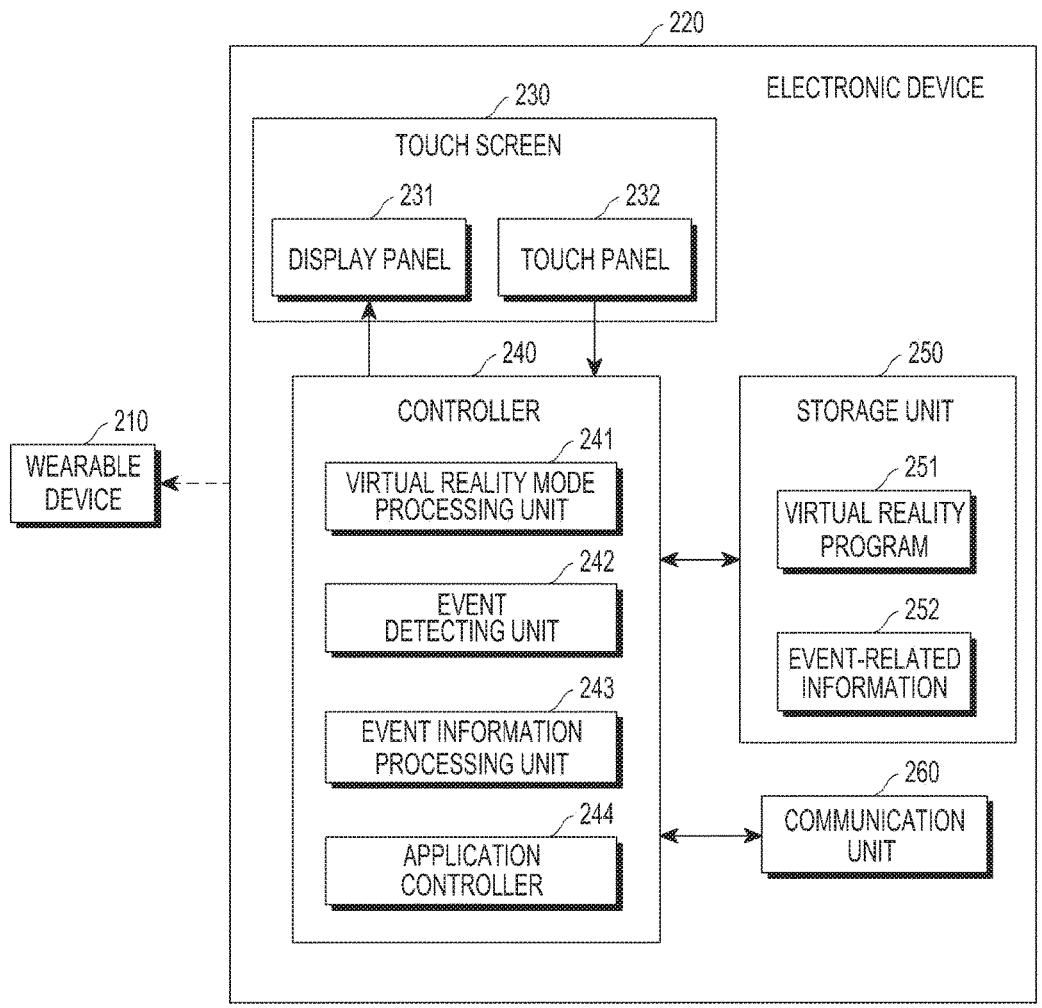
FIG. 2 is a block diagram illustrating an exemplary configuration of an electronic device according to an embodiment of the present invention.

FIG. 2 is a block diagram illustrating an exemplary configuration of an electronic device according to an embodiment of the present invention. Referring to FIG. 2, the electronic device 220 according to an embodiment of the present invention may be an electronic device 220 having at least one display means. In the following description, the electronic device 220 may be a device primarily performing a display function or may denote a normal electronic device including at least one display means. For example, the electronic device 220 may be an electronic device (e.g., a smartphone) having a touchscreen 230.

According to an embodiment of the present invention, the electronic device 220 may include at least one of a touchscreen 230, a controller 240, a storage unit 250, or a communication unit 260. The touchscreen 230 may include a display panel 231 and/or a touch panel 232. The controller 240 may include at least one of a virtual reality mode processing unit 241, an event determining unit 242, an event information processing unit 243, or an application controller 244.

For example, when the electronic device 220 is mounted in a wearable device 210, the electronic device 220 may operate, e.g., as an HMD, and run a virtual reality mode. Further, according to an embodiment of the present invention, even when the electronic device 220 is not mounted in the wearable device 210, the electronic device 220 may run the virtual reality mode according to the user's settings or running a virtual reality mode-related application. In the following embodiment, although the electronic device 220 is set to be mounted in the wearable device 210 to run the virtual reality mode, embodiments of the present invention are not limited thereto.

According to an embodiment of the present invention, when the electronic device 220 operates in the virtual reality mode (e.g., the electronic device 220 is mounted in the wearable device 210 to operate in a head mounted theater (HMT) mode), two screens (e.g., the screens shown in FIG. 7) corresponding to the user's eyes (left and right eye) may be displayed through the display panel 231.

According to an embodiment of the present invention, when the electronic device 220 is operated in the virtual reality mode, the controller 240 may perform control to process information related to an event generated while operating in the virtual reality mode to fit the virtual reality mode and display the processed information. According to an embodiment of the present invention, when the event generated while operating in the virtual reality mode is an event related to running an application, the controller 240 may block the running of the application or process the application to operate as a background.

More specifically, according to an embodiment of the present invention, the controller 240 may include at least one of a virtual reality mode processing unit 241, an event determining unit 242, an event information processing unit 243, or an application controller 244 to perform functions according to various embodiments of the present invention. An embodiment of the present invention may be implemented to perform various operations or functions related to FIGS. 3 to 25 using at least one component of the electronic device 220 (e.g., the touchscreen 230, controller 240, or storage unit 250).

According to an embodiment of the present invention, when the electronic device 220 is mounted in the wearable device 210 or the virtual reality mode is run according to the user's setting or as a virtual reality mode-related application runs, the virtual reality mode processing unit 241 may process various functions related to the operation of the virtual reality mode. The virtual reality mode processing unit 241 may load at least one virtual reality program 251 stored in the storage unit 250 to perform various functions.

The event determining unit 242 may determine an event generated while operated in the virtual reality mode by the virtual reality mode processing unit 241. Further, the event determining unit 242 may determine whether there is information to be displayed on the screen in relation with an event generated while operating in the virtual reality mode. Further, the event determining unit 242 may determine an application to be run in relation with an event generated while operating in the virtual reality mode. Various embodiments of an application related to the type of event are described below with reference to FIGS. 13 to 25.

Figure 7:
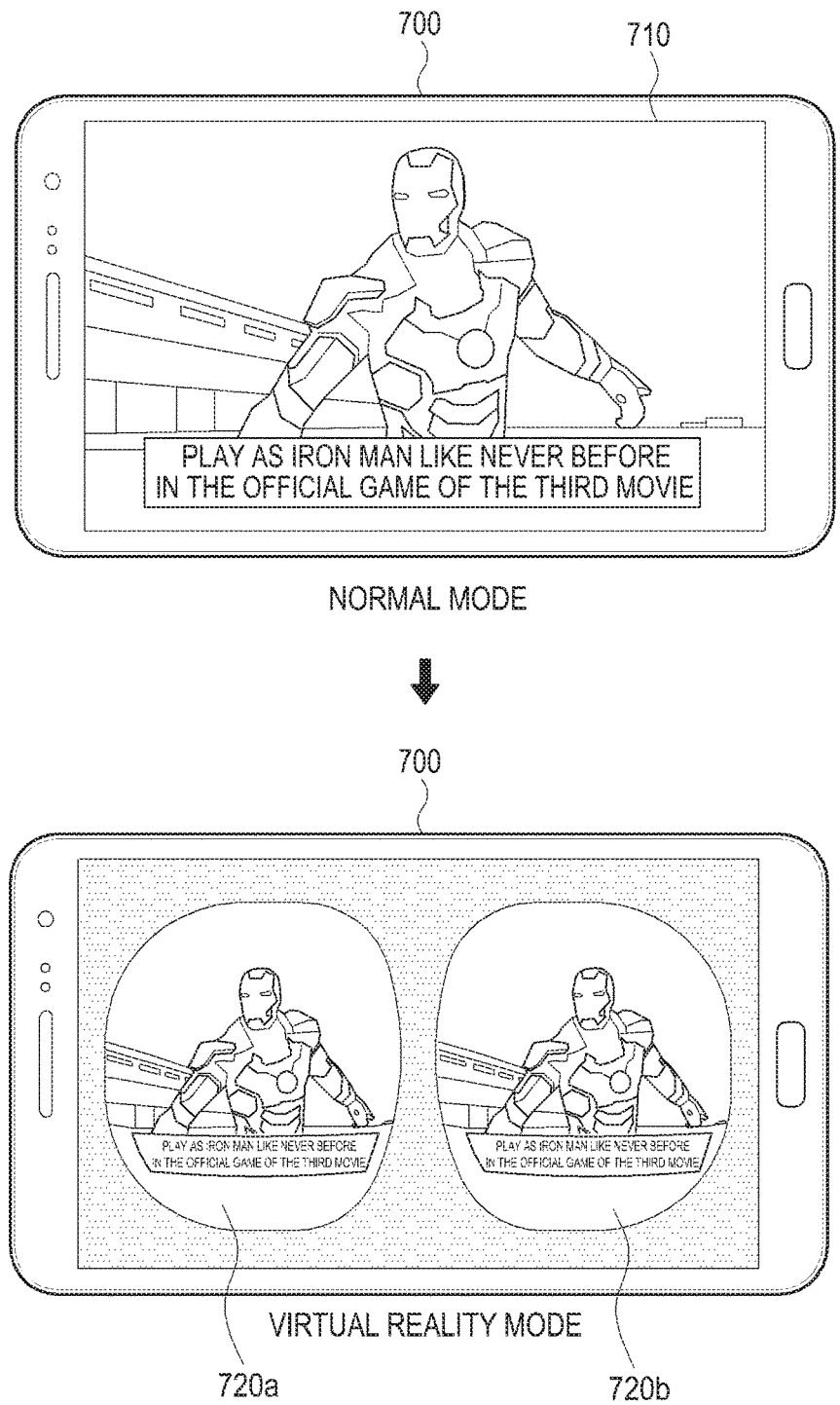
FIG. 7 is a view illustrating a screen mode of an electronic device according to an embodiment of the present invention.

The event information processing unit 243 may process the event-related information to be displayed on the screen to fit the virtual reality mode when there is information to be displayed in relation with an event occurring while operating in the virtual reality mode depending on the result of determination by the event determining unit 242. Various methods for processing the event-related information may apply. For example, when a three-dimensional (3D) image is implemented in the virtual reality mode as shown in FIG. 7, the electronic device 220 may convert the event-related information to fit the 3D image. For example, event-related information being displayed in two dimension (2D) may be converted into information corresponding to the left and right eye corresponding to the 3D image, and the converted information may be synthesized and displayed on the screen of the virtual reality mode being currently run.

When it is determined by the event determining unit 242 that there is an application to be run in relation with the event occurring while operating in the virtual reality mode, the application controller 244 may perform control to block the running of the application related to the event. According to an embodiment of the present invention, when it is determined by the event determining unit 242 that there is an application to be run in relation with the event occurring while operating in the virtual reality mode, the application controller 244 may perform control so that the application is run on the background not to influence the running or screen display of the application corresponding to the virtual reality mode when the event-related application runs.

The storage unit 250 may store a virtual reality program 251. The virtual reality program 251 may be an application related to the virtual reality mode operation of the electronic device 220. The storage unit 250 may store the event-related information 252. The event determining unit 242 may reference the event-related information 252 stored in the storage unit 250 to determine whether the occurring event is displayed on the screen or identify information on the application to be run in relation with the occurring event.

The wearable device 210 may be an electronic device including at least one function of the electronic device 101 shown in FIG. 1, and the wearable device 210 may be a wearable stand to which the electronic device 220 may be mounted. In case the wearable device 210 is an electronic device, when the electronic device 220 is mounted on the wearable device 210, various functions may be provided through the communication unit 260 of the electronic device 220. For example, when the electronic device 220 is mounted on the wearable device 210, the electronic device 220 may detect whether to be mounted on the wearable device 210 for communication with the wearable device 210 and may determine whether to operate in the virtual reality mode (or an HMT mode).

According to an embodiment of the present invention, upon failure to automatically determine whether the electronic device 220 is mounted when the communication unit 220 is mounted on the wearable device 210, the user may apply various embodiments of the present invention by running the virtual reality program 251 or selecting the virtual reality mode (or, the HMT mode). According to an embodiment of the present invention, when the wearable device 210 includes functions as the electronic device 101, it may be implemented to automatically determine whether the electronic device 220 is mounted on the wearable device 210 and to enable the running mode of the electronic device 220 to automatically switch to the virtual reality mode (or the HMT mode).

At least some functions of the controller 240 shown in FIG. 2 may be included in the event processing module 180 or processor 120 of the electronic device 101 shown in FIG. 1. The touchscreen 230 or display panel 231 shown in FIG. 2 may correspond to the display 160 of FIG. 1. The storage unit 250 shown in FIG. 2 may correspond to the memory 130 of FIG. 1.

Although in FIG. 2 the touchscreen 230 includes the display panel 231 and the touch panel 232, according to an embodiment of the present invention, the display panel 231 or the touch panel 232 may also be provided as a separate panel rather than being in a single touchscreen 230. Further, according to an embodiment of the present invention, the electronic device 220 may include the display panel 231 but exclude the touch panel 232.

According to an embodiment of the present invention, the electronic device 220 may be denoted as a first device (or a first electronic device), and the wearable device 210 may be denoted as a second device (or a second electronic device) for ease of description.

According to an embodiment of the present invention, an electronic device may comprise a display unit displaying a screen corresponding to a virtual reality mode and a controller performing control to detect an interrupt according to occurrence of at least one event, vary event-related information related to the event in a form corresponding to the virtual reality mode, and display the varied event-related information on a screen run corresponding to the virtual reality mode.

according to an embodiment of the present invention, the event may include any one or more selected from among a call reception event, a message reception event, an alarm notification, a scheduler notification, a wireless fidelity (Wi-Fi) connection, a Wi-Fi disconnection, a low battery notification, a data permission or use restriction notification, a no application response notification, or an abnormal application termination notification.

According to an embodiment of the present invention, the electronic device further comprises a storage unit storing the event-related information when the event is not an event to be displayed in the virtual reality mode, wherein the controller may perform control to display the event-related information stored in the storage unit when the electronic device switches from the virtual reality mode into a see-through mode.

According to an embodiment of the present invention, the electronic device may further comprise a storage unit storing information regarding at least one event to be displayed in the virtual reality mode.

According to an embodiment of the present invention, the event may include an instant message reception notification event.

According to an embodiment of the present invention, when the event is an event related to running at least one application, the controller may perform control to block running of the application according to occurrence of the event.

According to an embodiment of the present invention, the controller may perform control to run the blocked application when a screen mode of the electronic device switches from the virtual reality mode into a see-through mode.

According to an embodiment of the present invention, when the event is an event related to running at least one application, the controller may perform control to enable the application according to the occurrence of the event to be run on a background of a screen of the virtual reality mode.

According to an embodiment of the present invention, when the electronic device is connected with a wearable device, the controller may perform control to run the virtual reality mode.

According to an embodiment of the present invention, the controller may enable the event-related information to be arranged and processed to be displayed in a three-dimensional (3D) space of the virtual reality mode screen being displayed on a current screen.

Figure 3:
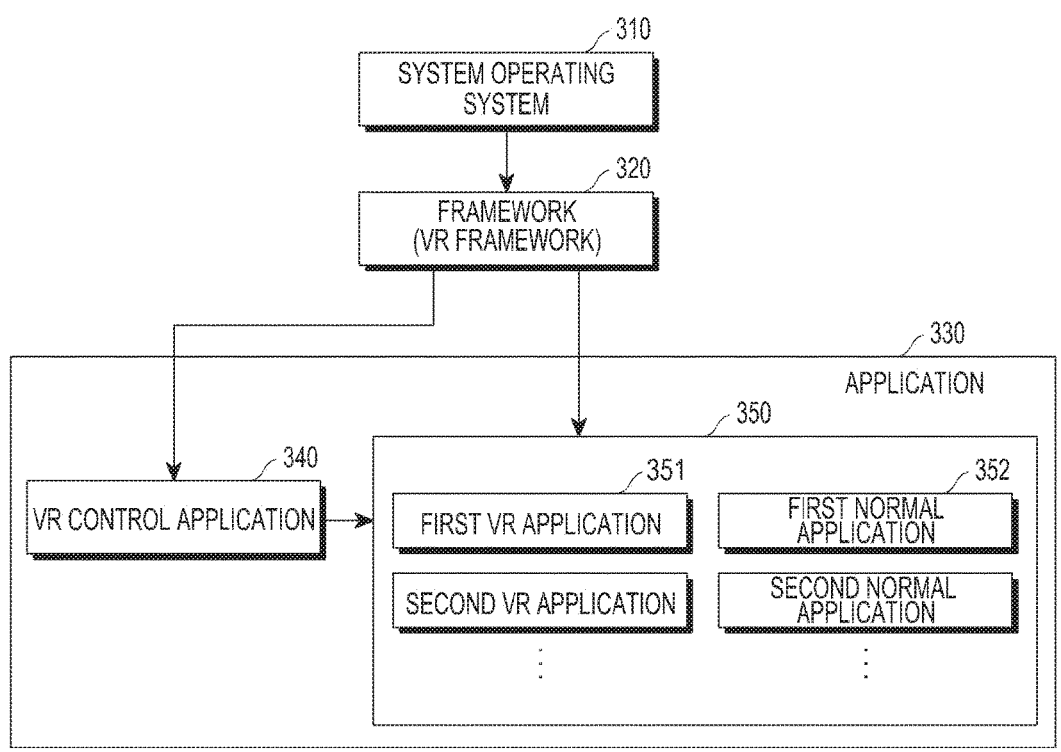
FIG. 3 is a block diagram illustrating a program module according to an embodiment of the present invention.

FIG. 3 is a block diagram illustrating a program module according to an embodiment of the present invention. Referring to FIG. 3, according to an embodiment of the present invention, the program module may include a system operating system (e.g., an OS) 310, a framework 320, an application 330.

The system operating system 310 may include at least one system resource manager or at least one device driver. The system resource manager may perform, e.g., control, allocation, or recovery of system resources, and the system resource manager may include at least one manager, such as a process manager, a memory manager, or a file system manager. The device driver may include at least one driver, such as, e.g., a display driver, a camera driver, a Bluetooth driver, a shared memory driver, a USB driver, a keypad driver, a Wi-Fi driver, an audio driver, or an inter-process communication (IPC) driver.

According to an embodiment of the present invention, the framework 320 (e.g., middleware) may provide, e.g., functions commonly required for the application or provide the application with various functions through the API to allow the application to efficiently use limited system resources inside the electronic device.

According to an embodiment of the present invention, the VR framework included in the framework 320 may control functions related to virtual reality mode operations on the electronic device. For example, according to running of a virtual reality mode operation, the VR framework 320 may control at least one VR application 351 related to virtual reality among applications 330 to provide the virtual reality mode on the electronic device.

The application 330 may include a plurality of applications and may include at least one VR application 351 running in the virtual reality mode and at least one normal application 352 running in a normal mode, but not the virtual reality mode.

According to an embodiment of the present invention, the application 330 may further include a VR control application 340. An operation of the at least one VR application 351 and/or at least one normal application 352 may be controlled under the control of the VR control application 340.

According to an embodiment of the present invention, when at least one event occurs while the electronic device operates in the virtual reality mode, the system operating system 310 may notify the framework 320 (e.g., the VR framework) of occurrence of the event.

The framework 320 may control the running of the normal application 352 so that event-related information may be displayed on the screen for the event occurring in the normal mode, but not in the virtual reality mode. When there is an application to be run in relation with the event occurring in the normal mode, the framework 320 may perform control to run at least one normal application 352.

According to an embodiment of the present invention, when an event occurs while operating in the virtual reality mode, the framework 320 (e.g., the VR framework) may block the operation of at least one normal application 352 to display the information related to the occurring event. The framework 320 may provide the event occurring while operating in the virtual reality mode to the VR control application 340.

The VR control application 340 may process the information related to the event occurring while operating in the virtual reality mode to fit the virtual reality mode. For example, 2D, planar event-related information may be processed into 3D information. The VR control application 340 may control at least one VR application 351 currently running and may perform control to synthesize the processed event-related information with the running screen by the VR application 351 and display the result.

According to an embodiment of the present invention, when an event occurs while operating in the virtual reality mode, the framework 320 may perform control to block the running of at least one normal application 352 related to the occurring event.

According to an embodiment of the present invention, when an event occurs while operating in the virtual reality mode, the framework 320 may perform control to temporarily block the running of at least one normal application 352 related to the occurring event, and when the virtual reality mode terminates, to run the blocked normal application 352.

According to an embodiment of the present invention, when an event occurs while operating in the virtual reality mode, the framework 320 may control the running of at least one normal application 352 related to the occurring event so that the at least one normal application 352 related to the event operates on the background so as not to influence the screen by the VR application 351 currently running.

The embodiment described in connection with FIG. 3 is an example for implementing an embodiment of the present invention in the form of a program, and embodiments of the present invention are not limited thereto and rather may be implemented in other various forms.

Figure 4:
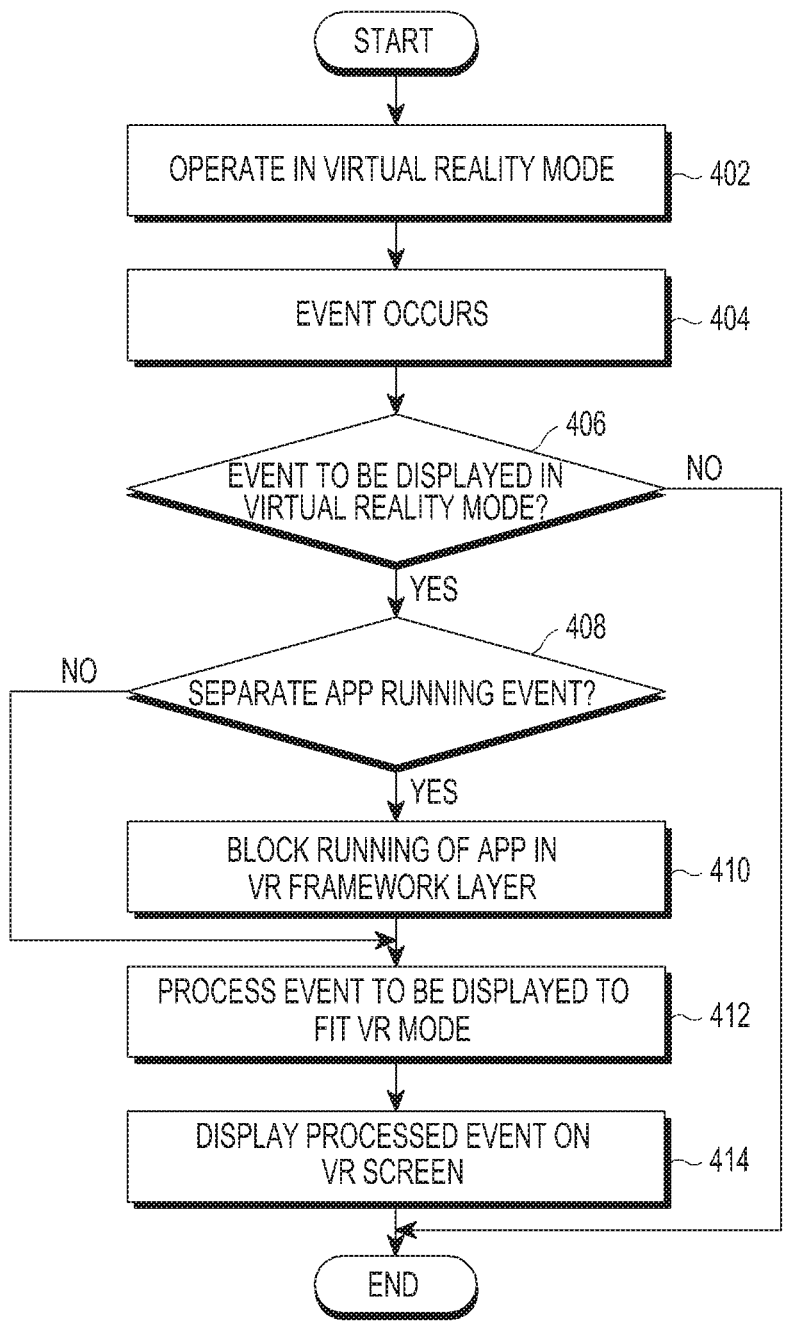
FIG. 4 is a flowchart illustrating a procedure for displaying an event in a virtual reality mode according to an embodiment of the present invention.
Figure 5A:
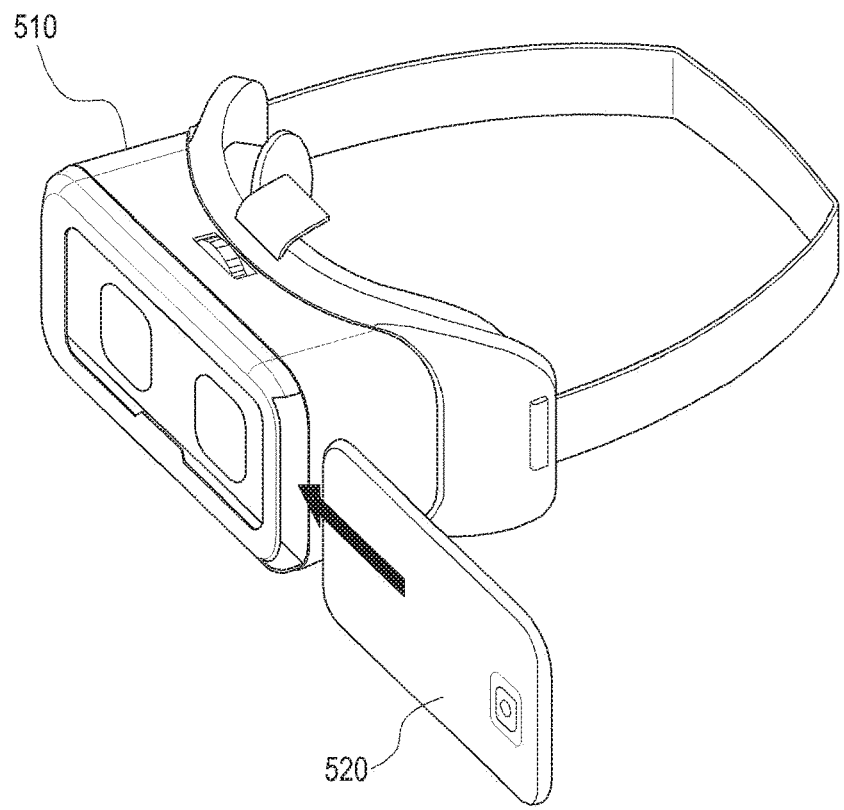
FIG. 5 is a view illustrating an example of a wearable device according to an embodiment of the present invention.
Figure 5B:
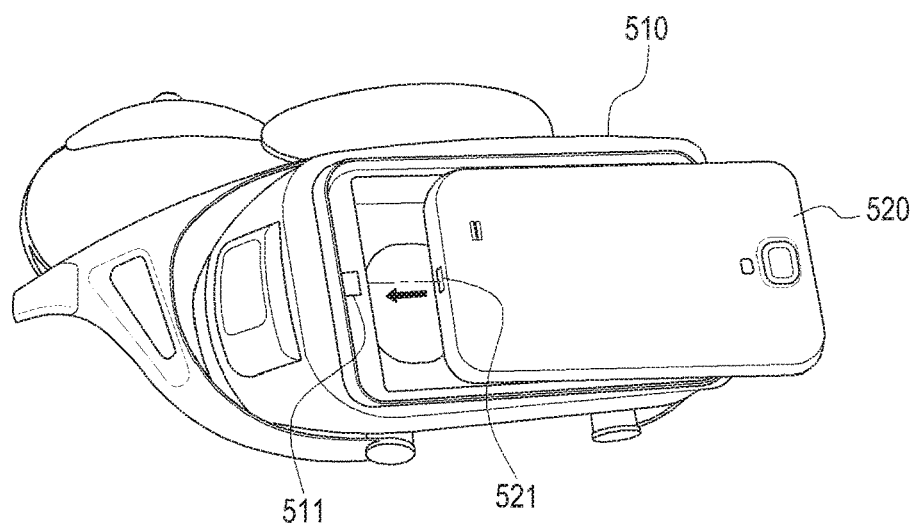
Figure 6:
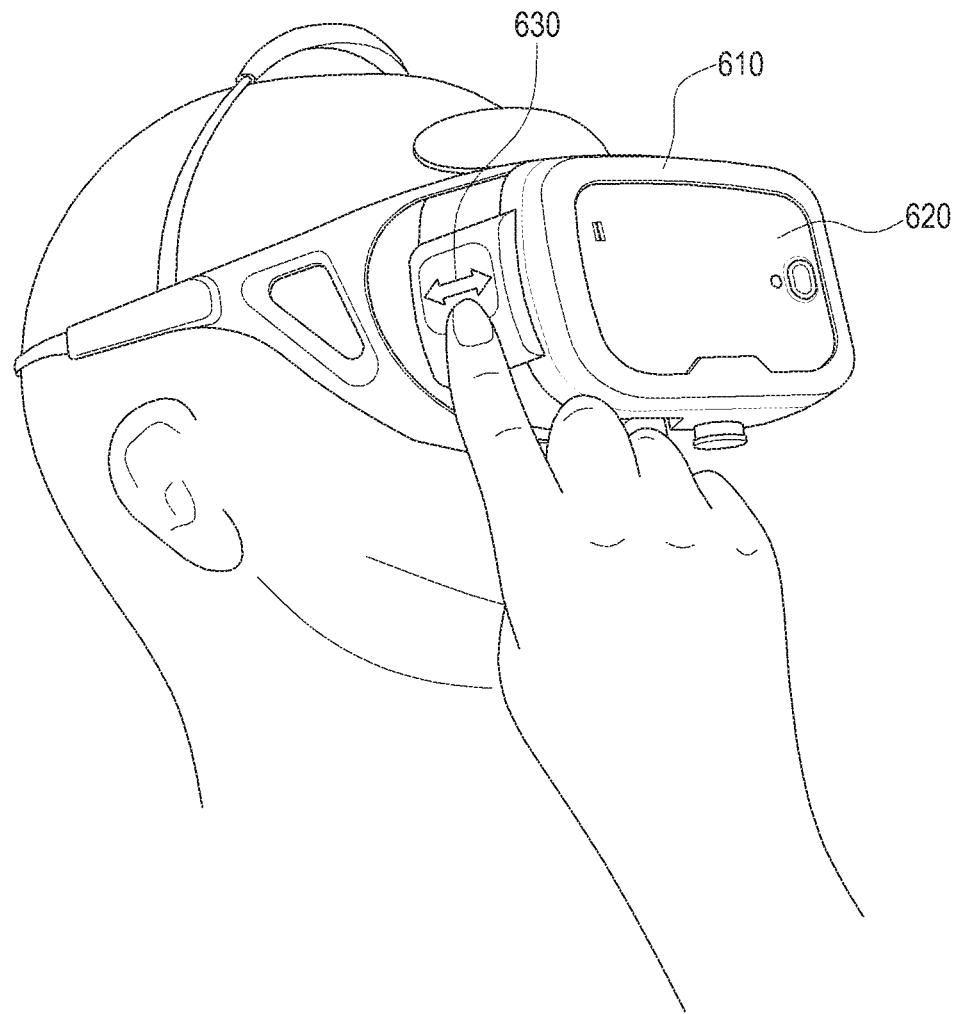
FIG. 6 is a view illustrating an example in which a user wears an electronic device-mounted wearable device according to an embodiment of the present invention.

FIG. 4 is a flowchart illustrating a procedure for displaying an event in a virtual reality mode according to an embodiment of the present invention. Referring to FIG. 4, when the electronic device performs the virtual reality mode, the electronic device is mounted or coupled with a wearable device as shown in FIGS. 5 and 6, or the electronic device is left to interwork with the wearable device, the electronic device may switch its mode from a normal mode to a virtual reality mode and operate in the virtual reality mode in operation 402. The electronic device runs the virtual reality mode (e.g., by the user's manipulation) and then connects to the wearable device, so that the virtual reality mode of the electronic device may be displayed on the wearable device.

When an interrupt is generated as at least one event occurs in operation 404 while operating in the virtual reality mode, a process related to the occurrence of event may be performed according to an embodiment of the present invention For example, when the event occurring in operation 406 is an event related to screen display, the information related to the occurring event according to an embodiment of the present invention may be processed in operation 412 and may be synthesized and displayed on the screen of the virtual reality mode currently running in operation 414.

When the event occurring according to an embodiment of the present invention is an event related to running a separate application in operation 408, the running of the application may be controlled to be blocked in operation 410. According to an embodiment of the present invention, the running of the application may be controlled to be performed on the background so as not to influence the screen according to the operation of the virtual reality mode. According to an embodiment of the present invention, after the running of the application is controlled to be blocked, when the running virtual reality mode is terminated or stopped, the blocked application may be controlled to be run.

At least one operation of the operations shown in FIG. 4 may be omitted, and at least one other operation may be added between the operations. Further, the operations shown in FIG. 4 may be processed in the order shown or the order of at least one operation and other operation may be varied. Further, the operations shown in FIG. 4 may be performed in the electronic device or server. Such an implementation may be made that at least one operation of the operations shown in FIG. 4 is performed in the electronic device while the other operations are performed in a server.

According to an embodiment of the present invention, an operating method by an electronic device may comprise running a virtual reality mode on the electronic device, detecting an interrupt according to occurrence of at least one event, varying event-related information related to the event in a form corresponding to the virtual reality mode, and displaying the varied event-related information on a screen run corresponding to the virtual reality mode.

according to an embodiment of the present invention, the event may include any one or more selected from among a call reception event, a message reception event, an alarm notification, a scheduler notification, a wireless fidelity (Wi-Fi) connection, a Wi-Fi disconnection, a low battery notification, a data permission or use restriction notification, a no application response notification, or an abnormal application termination notification.

According to an embodiment of the present invention, the method may further comprise storing the event-related information when the event is not an event to be displayed in the virtual reality mode and displaying the event-related information stored in the storage unit on the screen when a screen mode of the electronic device switches from the virtual reality mode into a see-through mode.

According to an embodiment of the present invention, the method may further comprise configuring at least one event to be displayed in the virtual reality mode.

According to an embodiment of the present invention, the stored event to be displayed may include an instant message reception notification event.

According to an embodiment of the present invention, when the event is an event related to running at least one application, the method may further comprise performing control to block running of the application according to occurrence of the event.

According to an embodiment of the present invention, the method may further comprise running the blocked application when a screen mode of the electronic device switches from the virtual reality mode into a see-through mode.

According to an embodiment of the present invention, when the event is an event related to running at least one application, the method may further comprise performing control to perform the running of the application according to the occurrence of the event on the background of the virtual reality mode screen.

According to an embodiment of the present invention, when the electronic device is connected with the wearable device, the virtual reality mode may be run.

According to an embodiment of the present invention, the operation of processing the event-related information may include arranging the event-related information to be displayed in a three-dimensional (3D) space of the virtual reality mode screen being displayed on a current screen.

Hereinafter, an example in which an electronic device (e.g., a smartphone) is mounted on a wearable device is described with reference to FIGS. 5 and 6.

FIG. 5 is a view illustrating an example of a wearable device 510 according to an embodiment of the present invention.

Referring to FIG. 5, the wearable device 510 may be the electronic device 102 of FIG. 1, for example. Further, as described above, the wearable device 510 may provide only functions of a mount or support with no communication functionality with the electronic device 520. The wearable device 510 may include a body and a cover.

When the electronic device 520 is mounted on the wearable device 510, the cover may cover the edge of a rear surface of the electronic device 520 to be fastened to the wearable device 510 so that the electronic device 520 may remain in a mounted position. The wearable device 510 may have a support available for the user to wear the wearable device 510 on his head.

The wearable device 510 may have lenses respectively corresponding to both eyes of the user (wearer). The user may view the display (not shown) of the electronic device 520 through the lenses with the electronic device 520 mounted on the wearable device 510. The wearable device 510 may have a mechanical or instrumental structure allowing the electronic device 520 to be mounted thereon as shown.

According to an embodiment of the present invention, the wearable device 510 may include at least one of the components of the electronic device 101 shown in FIG. 1. For example, the wearable device 510 may include at least one of a touch panel, a button, a wheel key, and a touch pad. The touch panel may receive the user's touch input. The touch input may include the user's touch on the touch panel or a hovering input near the touch panel. When the electronic device 520 is mounted, the wearable device 510 may connect with the electronic device via an interface, e.g., USB, to communicate with the electronic device 520.

The electronic device 520 may control a function corresponding to an input received from the wearable device 510 in response to the input. For example, the electronic device 520 may adjust the sound volume or control the screen (e.g., an image playing screen of the virtual reality mode) in response to the received input. For example, when the electronic device 520 is mounted on the wearable device 510, the external device connecting unit 521 of the electronic device 520 may be electrically connected with the connecting unit 511 of the wearable device 510 to enable communication between the devices.

Further, according to an embodiment of the present invention, when at least one event occurs while the electronic device 520 displays a screen according to the virtual reality mode, the information related to the occurring event may be processed into information fitting the virtual reality mode and the processed information may be displayed.

FIG. 6 is a view illustrating an example in which a user wears an electronic device 620-mounted wearable device 610 according to an embodiment of the present invention. As shown in FIG. 6, the user may wear the electronic device 620-mounted wearable device 610 on his head. The user may view the screen of the display of the electronic device 620 through the lenses of the wearable device 610.

Further, as shown in FIG. 6, the user may control the functions of the electronic device 620 or the functions of the wearable device 630 through the touch pad 630 provided in a side surface of the wearable device 630.

According to an embodiment of the present invention, the display of an event in the virtual reality mode may be implemented on, e.g., a smartphone or mobile phone or on the wearable device (e.g., a glasses-type device) as well. According to an embodiment of the present invention, as shown in FIGS. 5 and 6, the electronic device (e.g., a mobile phone) may be mounted or docked or coupled with the wearable device. For example, the screen of the mobile phone may be turned from the normal mode into the virtual reality mode when the mobile phone is mounted on the wearable device, and the converted screen of the virtual reality mode may be displayed through the display of the wearable device.

The mobile phone mounted on the wearable device supports the virtual reality mode but is operated normally by the operating system of the mobile phone, and thus, when an event occurs while in the virtual reality mode, a notification different from those made in the virtual reality mode may be displayed, or running of a separate application may affect the display in the virtual reality mode.

According to an embodiment of the present invention, there are provided methods for processing information related to an event occurring while operating in the virtual reality mode to fit the virtual reality mode for effective display when the virtual reality mode is provided by the electronic device having installed thereon an operating system operated in the normal mode.

FIG. 7 is a view illustrating a screen mode of an electronic device according to an embodiment of the present invention.

Referring to FIG. 7, the electronic device 700 may be the electronic devices 520 and 620 shown in FIGS. 5 and 6. When the electronic device 700 operates in the normal mode, it may display one operation screen 710 as shown in an upper portion of FIG. 7.

According to an embodiment of the present invention, when the electronic device 700 is mounted on a wearable device, it may be operated in the virtual reality mode (e.g., a HMT mode) as shown in a lower portion of FIG. 7. When the electronic device 700 is operated in the virtual reality mode, a screen 720 corresponding to the user's left eye and another screen 720b corresponding to the user's right eye may be distinctively displayed. In the screen of the virtual reality mode, one image may be separately displayed as two images 720a and 720b.

According to an embodiment of the present invention, when the electronic device 700 is mounted on the wearable device and operated in the virtual reality mode, the screens corresponding to the virtual reality mode (the screen 720a corresponding to the left eye and the screen 720b corresponding to the right eye) may be processed with the information related with the occurring event and displayed.

FIG. 8 is a view illustrating a screen for representing a method for displaying an event in a normal mode. Referring to FIG. 8, when the electronic device 800 operates in the normal mode, an application running in the normal mode may be displayed on one operation screen 810 as shown in an upper portion of FIG. 8.

When at least one event (e.g., an incoming call event) occurs while the electronic device 800 operates in the normal mode (e.g., upon receiving a call from the opposite party), event-related information 820 related to the event may be displayed at a predetermined position on the operation screen 810 of the application.

Figure 9:
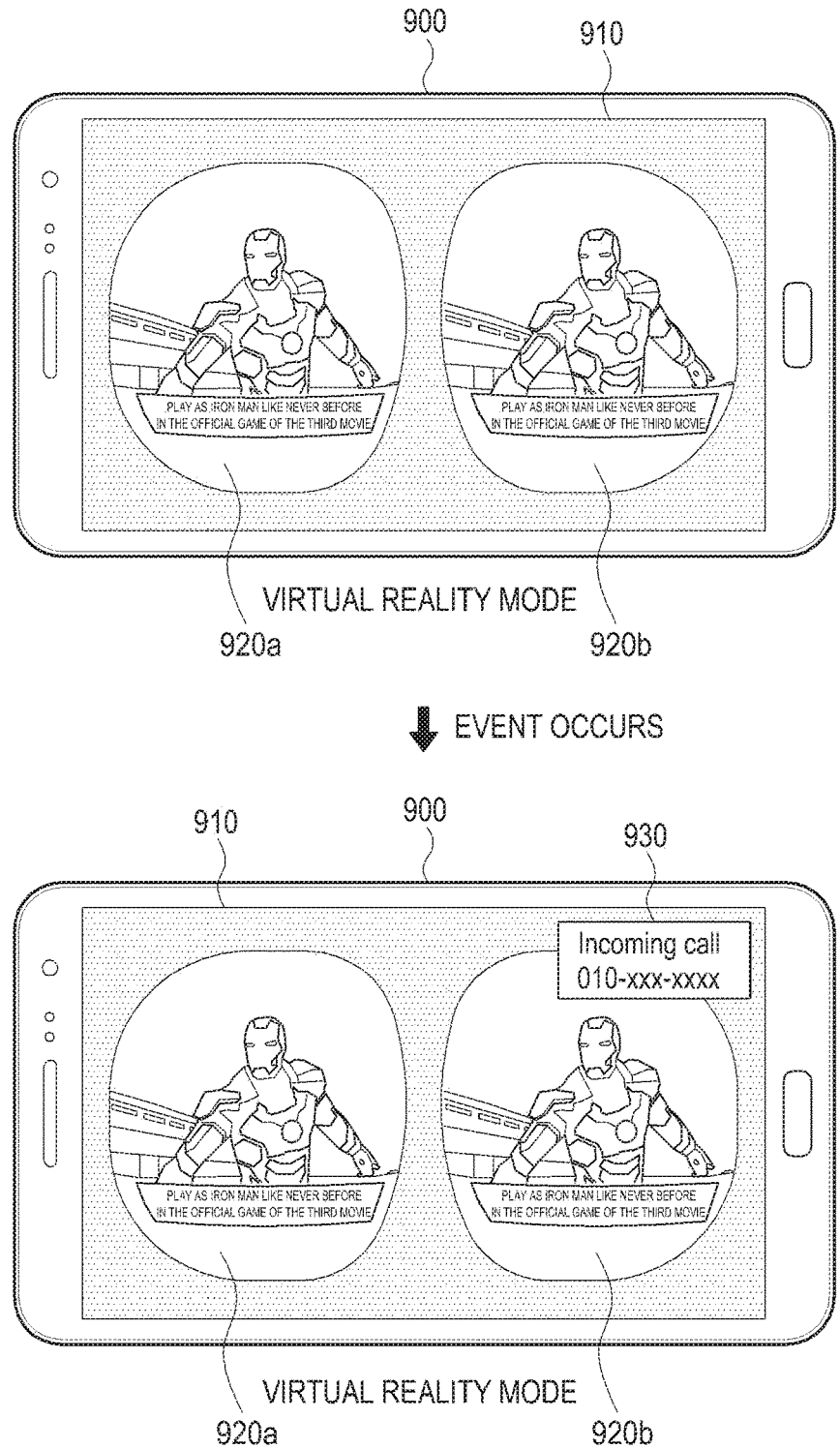
FIG. 9 is a view illustrating a screen for representing a method for displaying an event in a virtual reality mode.

FIG. 9 is a view illustrating a screen for representing a method for displaying an event in a virtual reality mode. Referring to FIG. 9, when the electronic device 900 operates in the virtual reality mode, an application run in the virtual reality mode may be separately displayed on the screen 920a corresponding to the user's left eye and the screen 920b corresponding to the user's right eye as shown in an upper portion of FIG. 9. In the screen of the virtual reality mode, one image may be separately displayed as two images 920a and 920b.

When at least one event (e.g., an incoming call event) occurs while the electronic device 900 operates in the virtual reality mode (e.g., upon receiving a call from the opposite party), event-related information 930 related to the occurring event may be displayed at a predetermined position on the operation screen 910 of the application.

In case the event-related information 930 is information displayed in the normal mode, when the information displayed in the normal mode is displayed without processing as shown in a lower portion of FIG. 9, the event-related information 930 might not normally be displayed in the currently running virtual reality mode.

Figure 10:
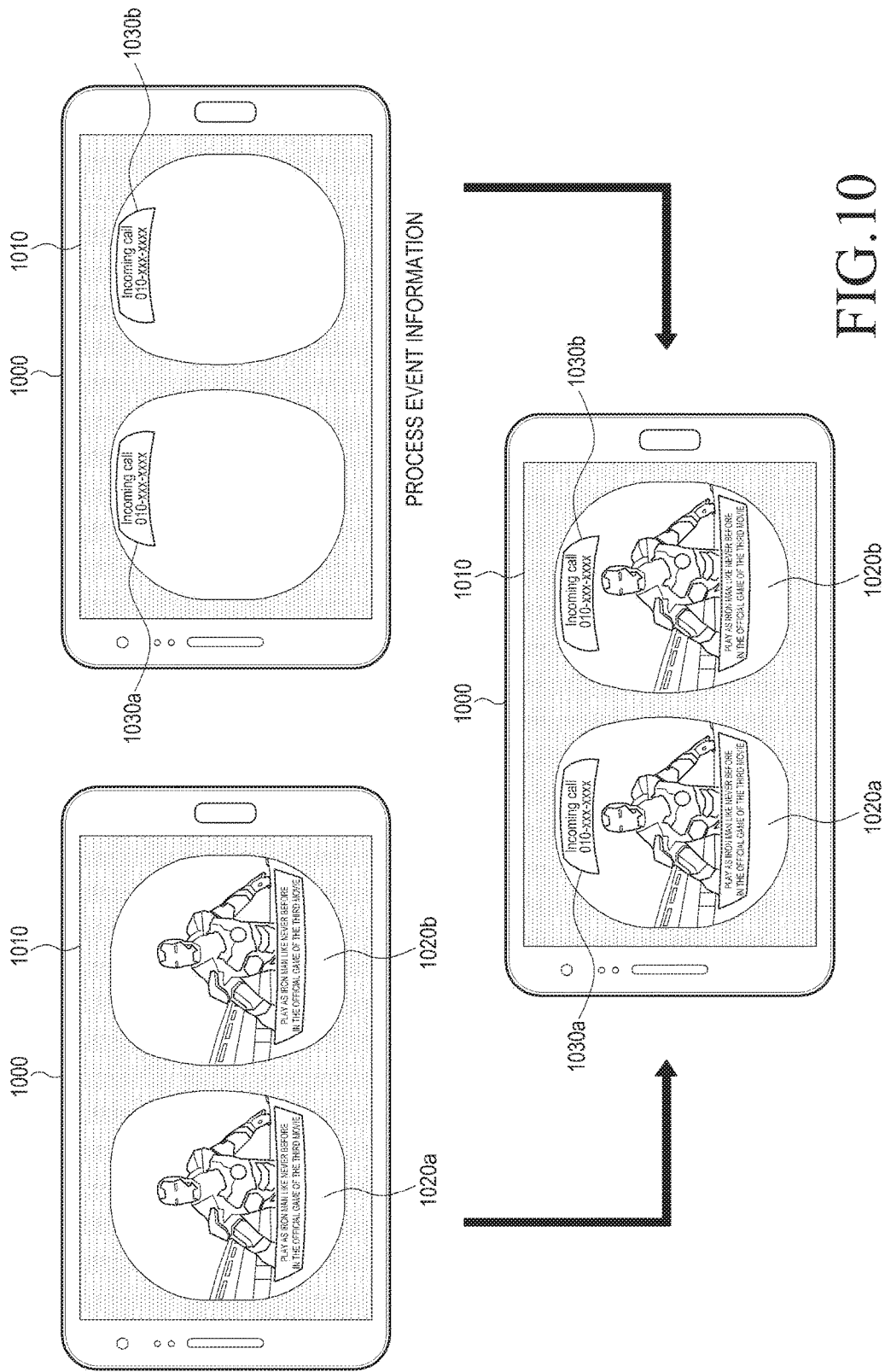
FIG. 10 is a view illustrating an example screen of representing a method for displaying an event in a virtual reality mode according to an embodiment of the present invention.

FIG. 10 is a view illustrating an example screen of representing a method for displaying an event in a virtual reality mode according to an embodiment of the present invention Referring to FIG. 10, when the electronic device 1000 operates in the virtual reality mode, an application run in the virtual reality mode may be separately displayed on the screen 1020a corresponding to the user's left eye and the screen 1020b corresponding to the user's right eye as shown in an upper portion of FIG. 10. In the screen of the virtual reality mode, one image may be separately displayed as two images 1020a and 1020b.

When at least one event (e.g., an incoming call event) occurs while the electronic device 1000 operates in the virtual reality mode (e.g., upon receiving a call from the opposite party), the event-related information 1030a and 1030b related to the occurring event may be processed and displayed to fit the virtual reality mode according to an embodiment of the present invention.

Figure 11:
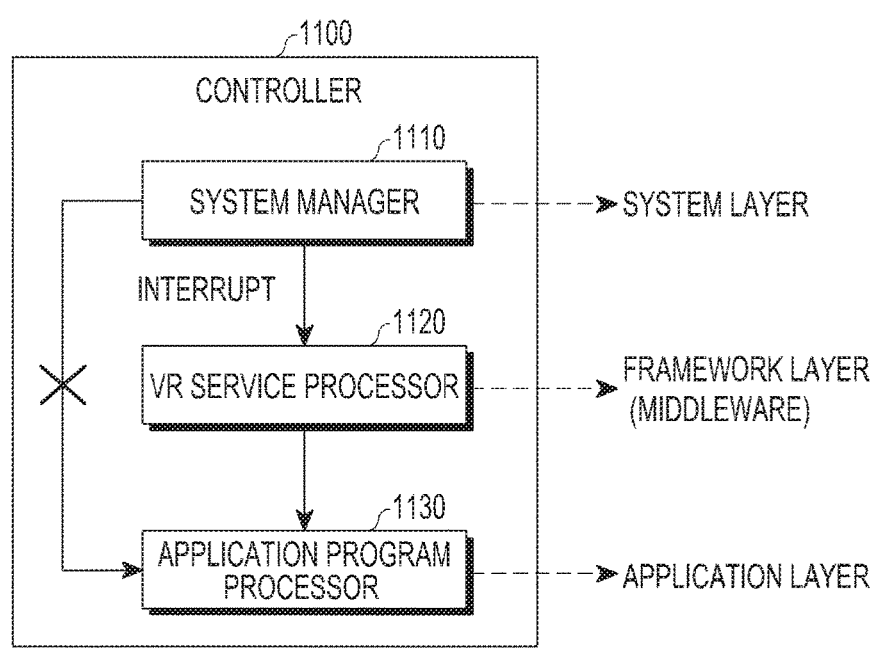
FIG. 11 is a block diagram illustrating a detailed structure of a controller according to an embodiment of the present invention.

FIG. 11 is a block diagram illustrating a detailed structure of a controller according to an embodiment of the present invention. Referring to FIG. 11, according to an embodiment of the present invention, the controller may include a system manager 1110, a virtual reality (VR) service processor 1120, and an application program processor 1130.

The system manager 1110 may correspond to a system layer and may be an operating system (OS) of the electronic device or at least a portion of the OS. The VR service processor 1120 may perform various processes according to the virtual reality mode according to an embodiment of the present invention. The VR service processor 1120 may be implemented as middleware corresponding to a framework layer. The application program processor 1130 may correspond to an application layer and may perform a function for processing various applications (or apps) installed and run on the electronic device.

When the virtual reality mode is run on the electronic device or the electronic device is mounted on the wearable device, the VR service processor 1120 according to an embodiment of the present invention may switch the normal mode into the virtual reality mode and display a screen according to the virtual reality mode through the display unit.

Further, according to an embodiment of the present invention, the VR service processor 1120 may further perform a function of monitoring occurrence of an interrupt as an event occurs in the system manager 1110. For example, when a particular event occurs in the electronic device and thus an interrupt occurs in the system manager 1110, the VR service processor 1120 may detect the occurrence of the interrupt and provide information related to the event to the screen of the virtual reality mode according to an embodiment of the present invention.

According to an embodiment of the present invention, when there is an application to be run in relation with the occurring event, the system manager 1110 may perform processing so that the application may be run through the application program processor 1130 in the normal mode, but not in the virtual reality mode.

According to an embodiment of the present invention, when the same event occurs in the virtual reality mode, the running of the application related to the occurring event may be blocked. For example, as shown at X of FIG. 4, such processing as to enable the application related to the event occurring in the system manager 1110 to be run through the application program processor 1130 may be blocked. The function of blocking the running of the related application when an event occurs in the virtual reality mode may be implemented by modifying the function of the system manager 1110 or controlling the system by the VR service processor 1120. As such, according to an embodiment of the present invention, the distraction from the screen in the virtual reality mode may be prevented by blocking the running of the application related to the event occurring in the virtual reality mode.

Meanwhile, according to an embodiment of the present invention, as used herein, the term "functional unit" or "module" may denote hardware and a functional or structural combination of software for driving the hardware to implement the technical spirit according to an embodiment of the present invention. For example, it should be appreciated by one of ordinary skill in that art that each functional unit may be a logical unit of a predetermined code and a hardware resource for executing the code, and the functional unit does not necessarily mean a physically connected code or a type of hardware.

Figure 12:
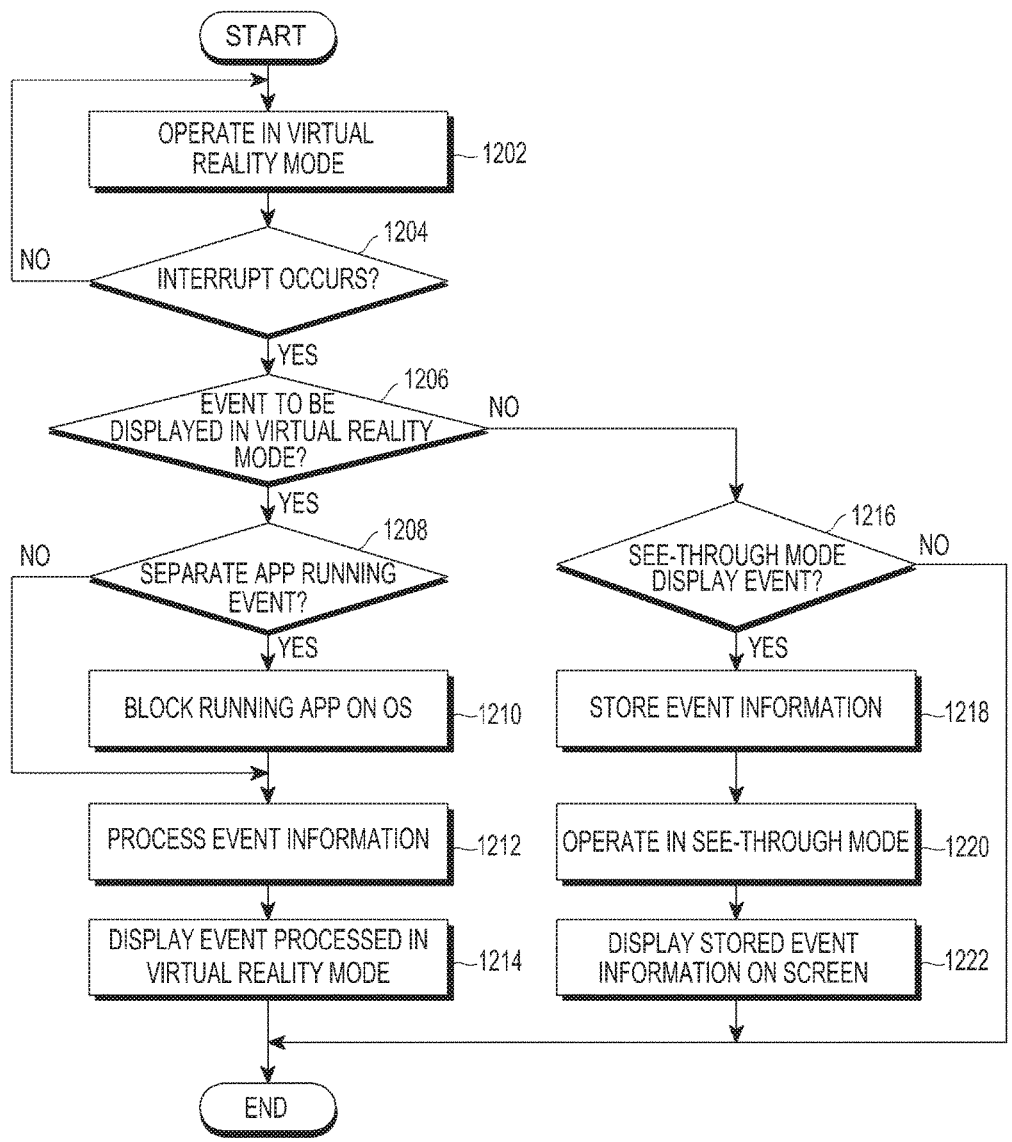
FIG. 12 is a flowchart illustrating a procedure for displaying an event in a virtual reality mode according to an embodiment of the present invention.

FIG. 12 is a flowchart illustrating a procedure for displaying an event in a virtual reality mode according to an embodiment of the present invention When the electronic device performs the virtual reality mode, the electronic device is mounted or coupled with a wearable device as shown in FIGS. 5 and 6, or the electronic device is left to interwork with the wearable device, the electronic device may switch its mode from a normal mode to a virtual reality mode and operate in the virtual reality mode in operation 1202. The electronic device runs the virtual reality mode (e.g., by the user's manipulation) and then connects to the wearable device, so that the virtual reality mode of the electronic device may be displayed on the wearable device.

When a particular event occurs and thus an interrupt is generated in operation 404 while operating in the virtual reality mode, the VR service processor 1120 may perform a process related to the occurrence of the event according to an embodiment of the present invention.

For example, when the occurring event is an event related to screen display in the currently running virtual reality mode in operation 1206, the information related to the occurring event according to an embodiment of the present invention may be processed in operation 1212, and the processed event-related information may be displayed on the screen of the virtual reality mode currently running in operation 1214.

According to an embodiment of the present invention, when the occurring event is an event related to running a separate application in operation 1208, the system manager (e.g., an operating system) 1110 or the VR service processor 1120 may control the application to be blocked from running in operation 1210.

According to an embodiment of the present invention, when the occurring event is an event (e.g., a messenger notification event) to be displayed in a see-through mode in operation 1216, the event-related information may be stored not to be displayed in the currently running virtual reality mode in operation 1218. Thereafter, when the electronic device operates from the virtual reality mode to the see-through mode in operation 1220, the event-related information related to the occurring event or information related to events accrued and stored may be displayed on the screen in operation 1222.

The see-through mode may mean a mode in which the user may view the front through the screen of the display unit. For example, the front image captured in realtime through a separate camera of the electronic device or the wearable device may be displayed, but methods for implementing the see-through mode are not limited thereto.

In the see-through mode, the event-related information displayed in the virtual reality mode may continuously be displayed even when switching into the see-through mode. Further, according to an embodiment of the present invention, the event-related information displayed in the virtual reality mode may be converted into another form to fit the see-through mode and displayed when turning into the see-through mode.

The see-through mode may be implemented to display all of the events that are not displayed in the virtual reality mode or may be implemented so that at least some predetermined events of the events not displayed in the virtual reality mode may be displayed. For example, among the events displayed in the virtual reality mode, only the notification event may be displayed in the see-through mode.

Further, according to an embodiment of the present invention, when the occurring event is an event that may be directly displayed without separate processing on the virtual reality mode screen currently in display, information related to the occurring event may be displayed on the screen of the current virtual reality mode. However, unless the occurring event is the event directly displayable on the screen of the virtual reality mode currently in display, an application for running the virtual reality mode may be re-run or a new virtual reality application may be additionally run to display the event-related information in the virtual reality mode.

Differentiation of the events to be displayed in the virtual reality mode in operation 1206 may be set in various manners. For example, an event (e.g., a call reception event) essentially required to be performed in the virtual reality mode may be set as an event to be displayed in the virtual reality mode. Further, according to an embodiment of the present invention, an event to be necessarily performed or at least one event configured by the user may be set to be blocked, so that even when the event occurs in the virtual reality mode, information related to the occurring event is not displayed or notified.

The method for displaying an event in the virtual reality mode according to an embodiment of the present invention may be implemented in the form of programming commands executable by various computer means, and the programming commands may be recorded in a computer-readable medium. The computer-readable medium may include programming commands, data files, or data structures, alone or in combinations thereof. The programming commands recorded in the medium may be specially designed and configured for the present invention or may be known and available to one of ordinary skill in the computer software-related art. Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands Examples of the programming commands may include, but are not limited to, high-level language codes executable by a computer using, e.g., an interpreter, as well as machine language codes as created by a compiler. The above-described hardware devices may be configured to operate as one or more software modules to perform operations according to an embodiment of the present invention, or the software modules may be configured to operate as one or more hardware modules to perform the operations.

The method for notifying various events in the virtual reality mode as set forth above may be set as shown in Table 1. However, the embodiment of Table 1 is provided merely for a better understanding of various embodiments of the present invention, and embodiments of the present invention are not limited thereto.

TABLE 1

| | | | Processing scenario | |
|---|---|---|---|---|
| | Type | Interrupt scenario | Notification set | Notification unset |
| Screen | Run app | alarm/scheduler app reception data call | VR popup notification (app running notification) | no notification |
| | | reception call (Voice/Video) | VR app User's selection (Call accept/reject) | |

TABLE 1-continued

| | Type | Interrupt scenario | Processing scenario | |
| | | | Notification set | Notification unset |
|---|---|---|---|---|
| | Toast | Wi-Fi connection/disconnection | VR popup notification | |
| | Notification | Message Schedule, alarm | VR popup notification Partial information notification | |
| | System popup | Low battery Data permission/use restriction Application no response/abnormal termination | VR popup notification | Critical popup display Low battery No response/abnormal termination |
| Sound | Alarm sound Notification sound | Message notification sound | Accept | Block |
| Vibration | Run app Vibration notification | Phone, alarm Message | | Block |

Referring to Table 1, when an interrupt occurs in various events, a notification method in the virtual reality mode may be determined according to the user's notification method settings. Information related to at least one event to be displayed in the virtual reality mode may be implemented to be configured through a separate setting function on the electronic device.

For example, when a notification is set for an event (e.g., an alarm/scheduler app, reception data call) coming with running of an application, the application related to the event may be blocked from running, and a notification may be shown as a popup (a virtual reality (VR) popup) on the virtual reality mode screen while operating in the virtual reality mode.

According to an embodiment of the present invention, the application related to the event may be run on the background so as not to affect the screen of the currently running virtual reality mode. In this case, a popup-type notification may be shown on the virtual reality mode screen to indicate that the related application is running on the background.

According to an embodiment of the present invention, when a notification is set for an event (e.g., a voice or video call-related event) coming with running of an application and user's selection, a popup screen where the user's selection (e.g., call accept or reject) may be made in relation with the event may be displayed on the virtual reality mode screen.

According to an embodiment of the present invention, an event such as Wi-Fi connection or disconnection may be displayed in the form of a toast notification. According to an embodiment of the present invention, the toast notification may be included and displayed on the virtual reality mode screen. The toast notification may mean a notification that is displayed as a popup, and after a predetermined time, disappears.

According to an embodiment of the present invention, when an event providing a simple notification occurs without coming with running of a separate application, no procedure for blocking a separate application is required, and information related to the event may be processed to be displayed as a popup on the virtual reality mode screen.

According to an embodiment of the present invention, a sound-type notification, such as an alarm or notification sound may be implemented to be accepted or rejected during the virtual reality mode depending on notification settings. According to an embodiment of the present invention, a vibration-type notification coming together as an application runs or a notification is made may be set to be blocked during the virtual reality mode.

FIGS. 13 to 25 are views illustrating screens displaying information related to events in a virtual reality mode according to an embodiment of the present invention.

Figure 13:
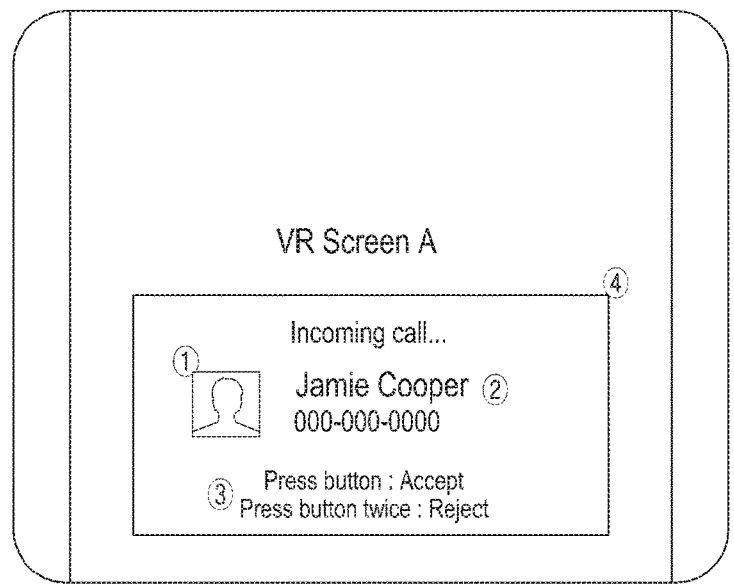
FIG. 13 is a view illustrating an example of a screen of displaying an event in a virtual reality mode according to an embodiment of the present invention.

Referring to FIG. 13, when an event such as, e.g., call reception, occurs in the virtual reality mode, the running of the call reception application may be blocked, and as shown, it may be displayed as a popup to be included in the virtual reality mode screen according to an embodiment of the present invention.

Here, the popup screen may be a screen included in the virtual reality. For example, rather than the popup screen is displayed overlapping the virtual reality mode screen on the same plane, the popup screen and the virtual reality mode screen may be displayed in one virtual reality mode screen rearranged in the 3D space according to an embodiment of the present invention.

Figure 14:
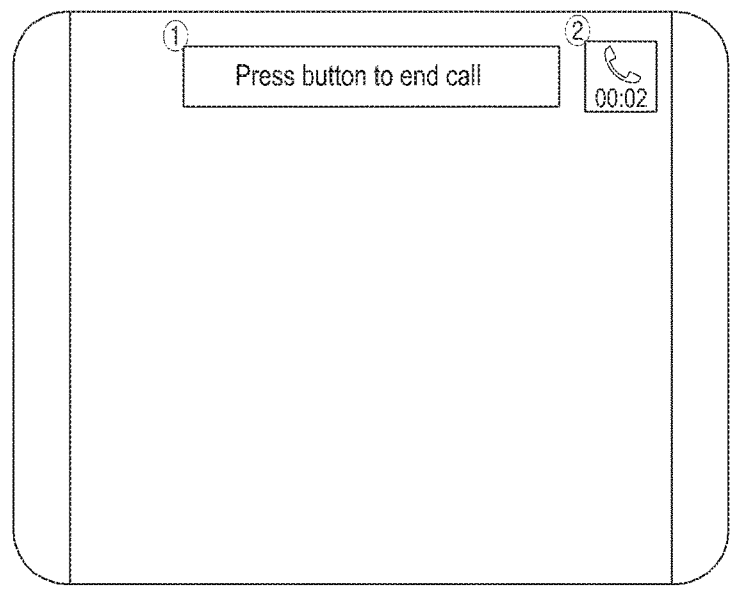
FIG. 14 is a view illustrating an example of a screen of displaying an event in a virtual reality mode according to an embodiment of the present invention.

For example, as described above, when a call reception event occurs while the electronic device operates in the virtual reality mode, the system manager or VR service processor in the electronic device may block the running of a separate call reception application and may process information related to the occurring event to be included in the virtual reality mode screen currently being displayed so that a single virtual reality screen may be displayed. The user may accept or reject the call by selecting the button displayed in the popup. Further, when the reception in FIG. 13 is selected, information related to the call state as shown in FIG. 14 may be processed and displayed on the virtual reality mode screen.

Figure 15:
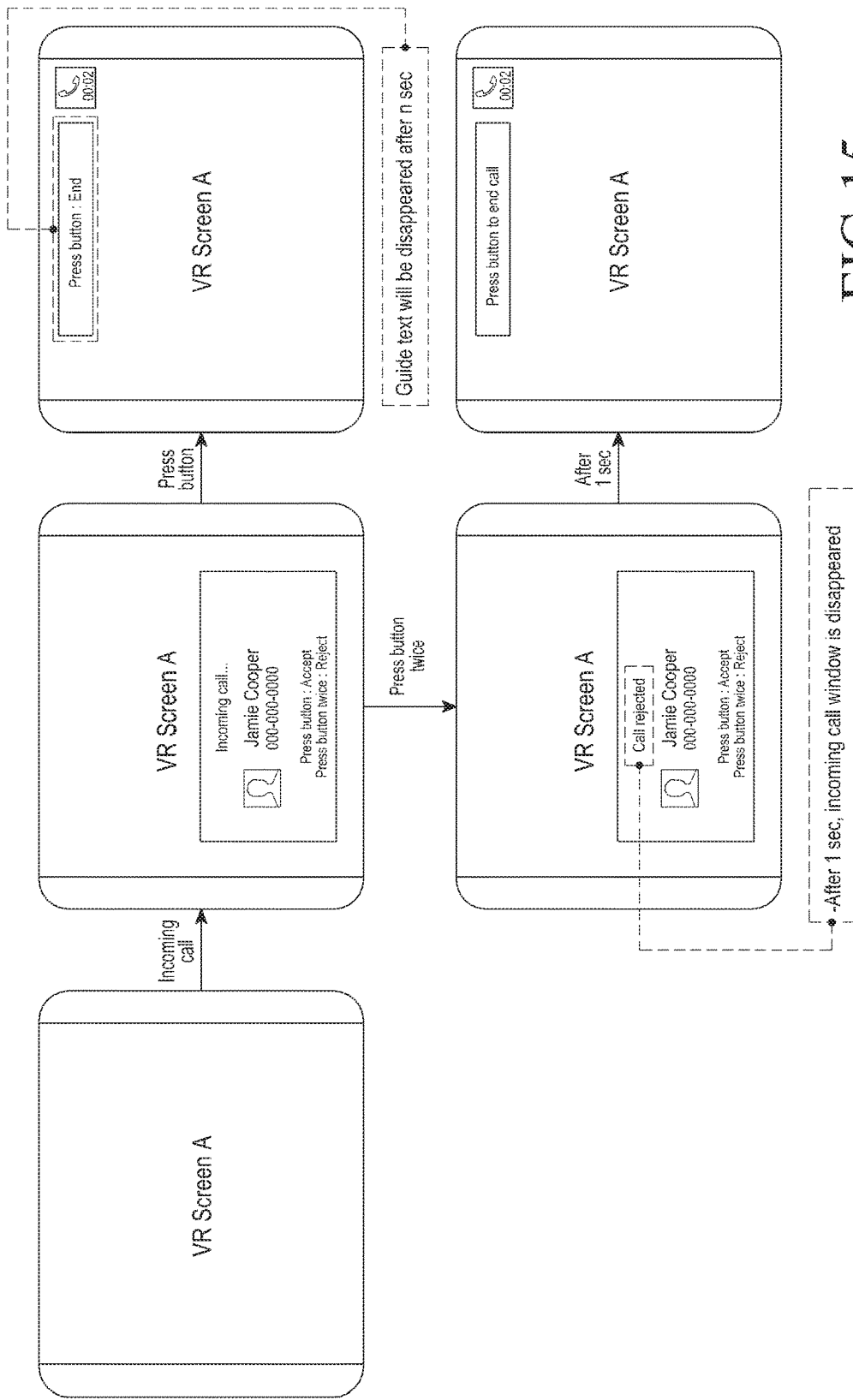
FIG. 15 is a view illustrating an example of a screen of displaying an event in a virtual reality mode according to an embodiment of the present invention.
Figure 16:
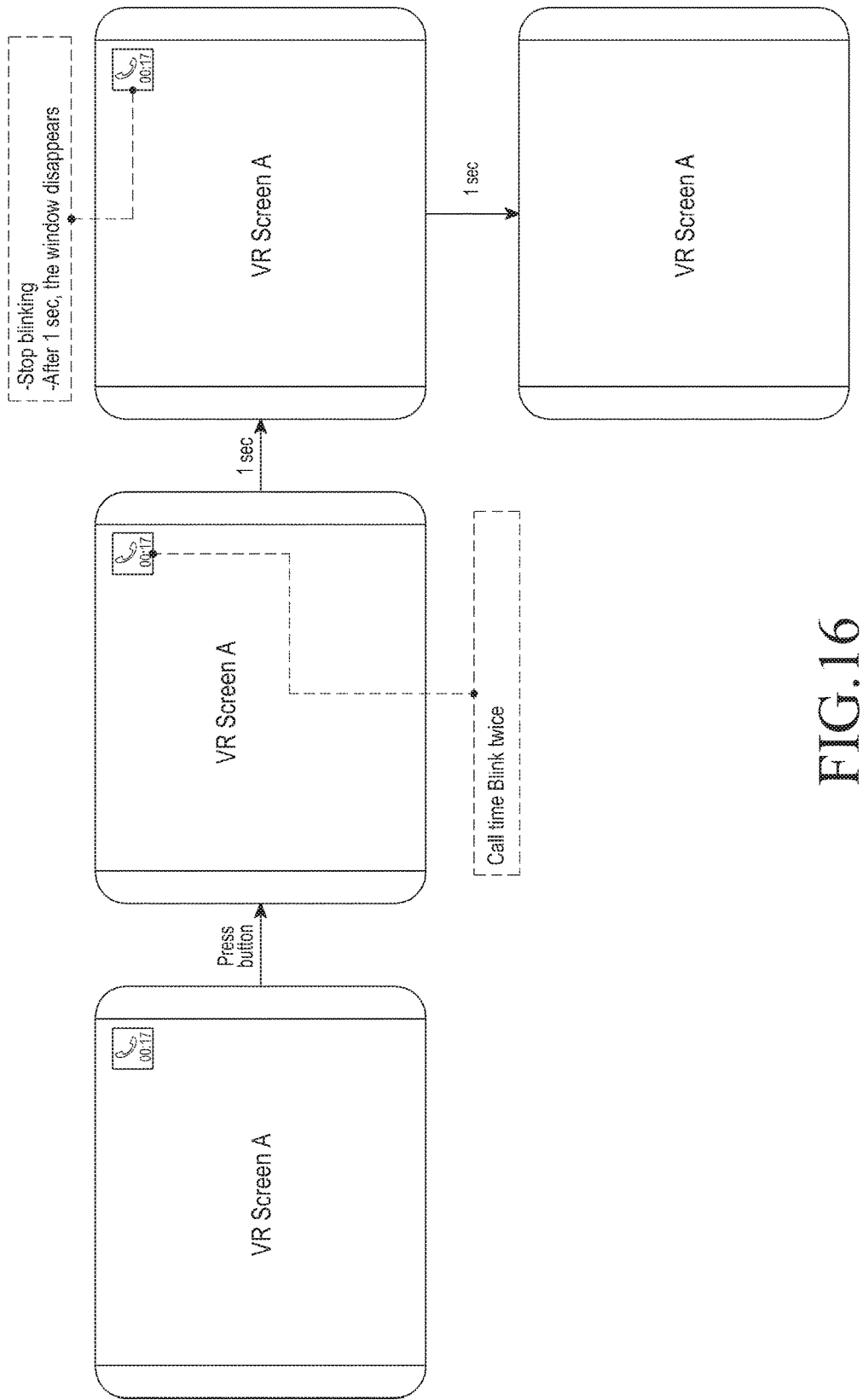
FIG. 16 is a view illustrating an example of a screen of displaying an event in a virtual reality mode according to an embodiment of the present invention.
Figure 17:
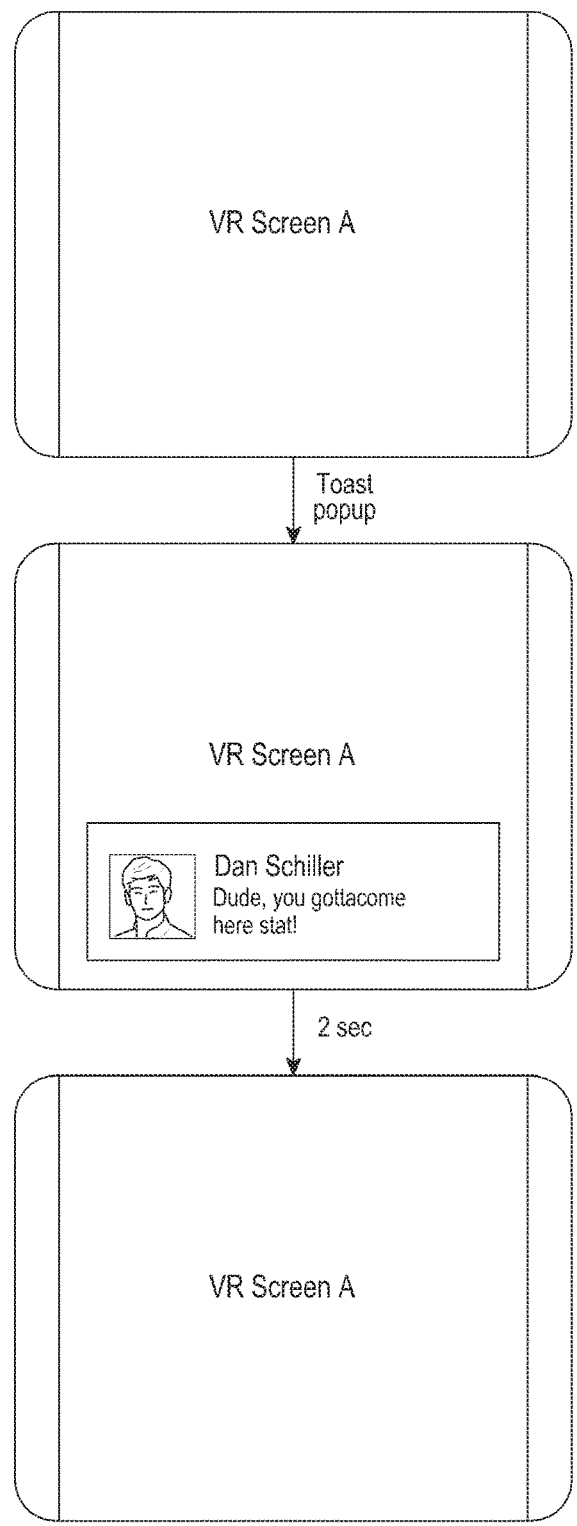
FIG. 17 is a view illustrating an example of a screen of displaying an event in a virtual reality mode according to an embodiment of the present invention.
Figure 18:
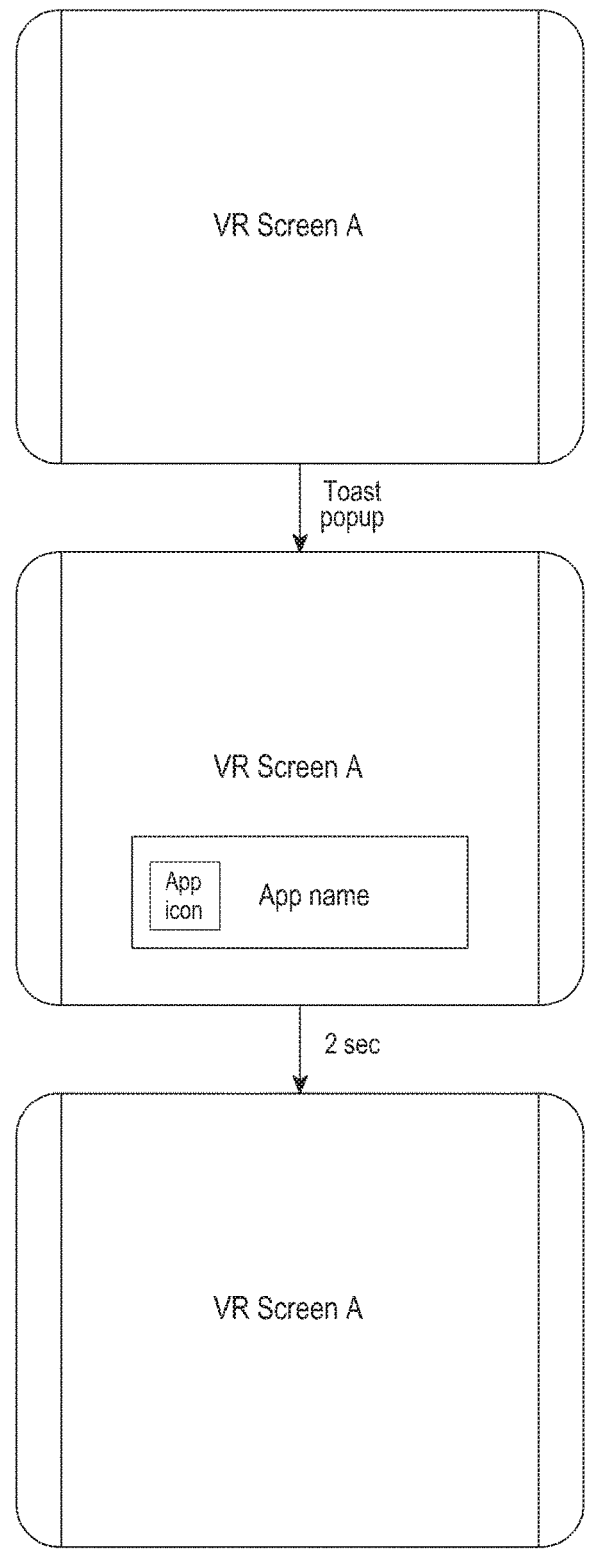
FIG. 18 is a view illustrating an example of a screen of displaying an event in a virtual reality mode according to an embodiment of the present invention.
Figure 19:
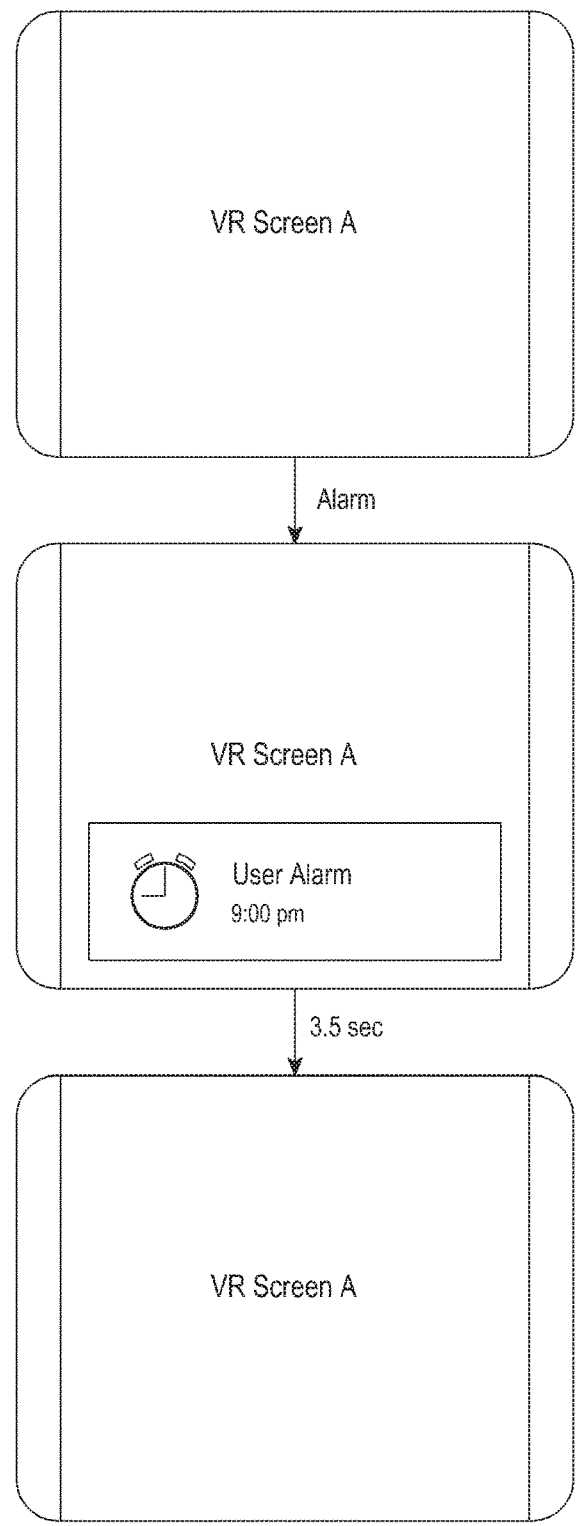
FIG. 19 is a view illustrating an example of a screen of displaying an event in a virtual reality mode according to an embodiment of the present invention.
Figure 20:
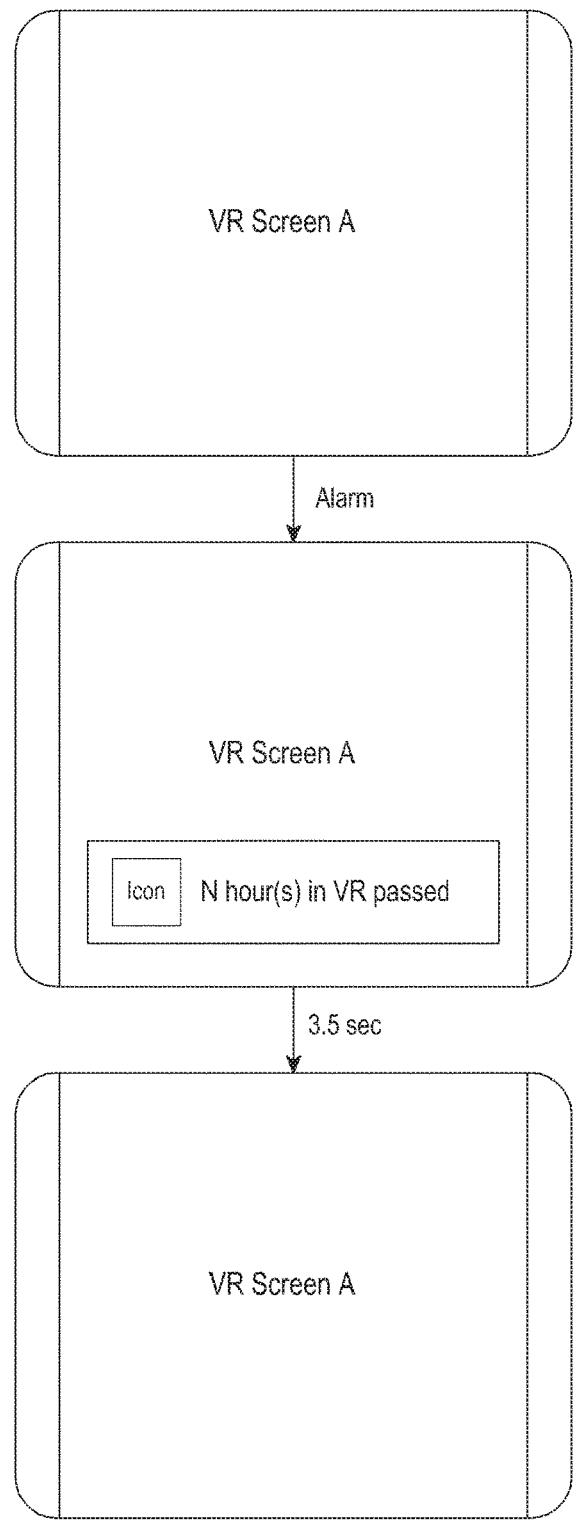
FIG. 20 is a view illustrating an example of a screen of displaying an event in a virtual reality mode according to an embodiment of the present invention.
Figure 21:
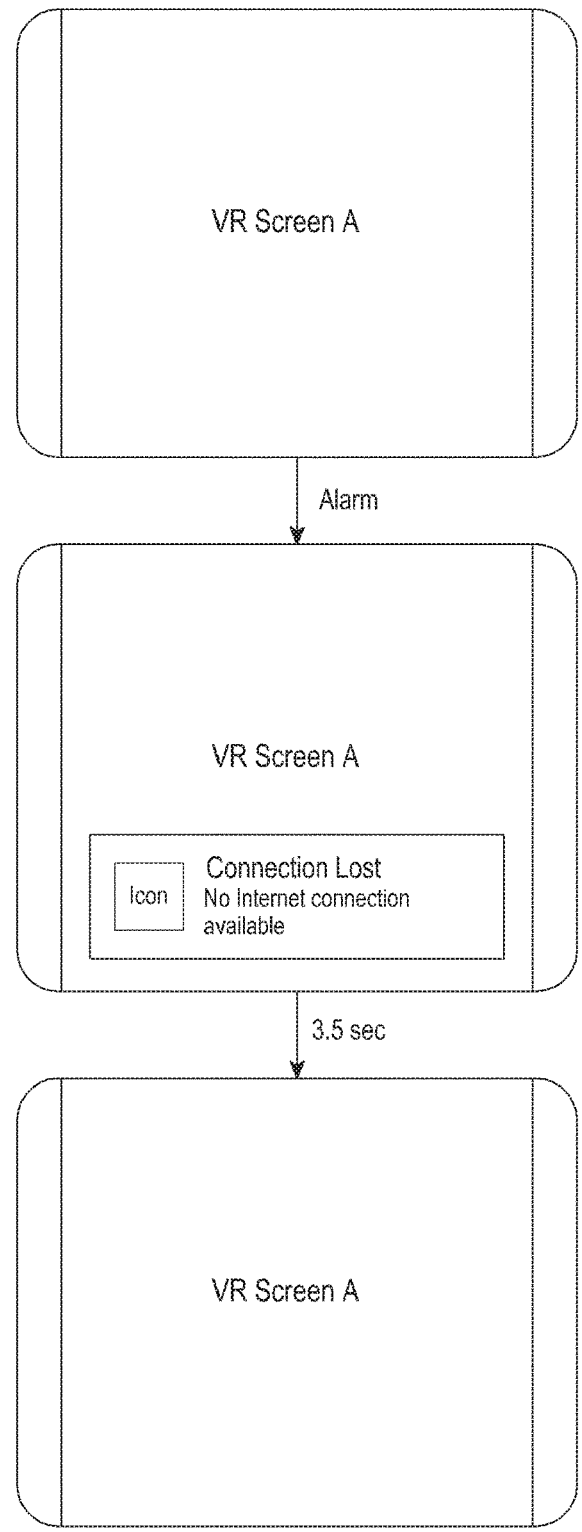
FIG. 21 is a view illustrating an example of a screen of displaying an event in a virtual reality mode according to an embodiment of the present invention.
Figure 22:
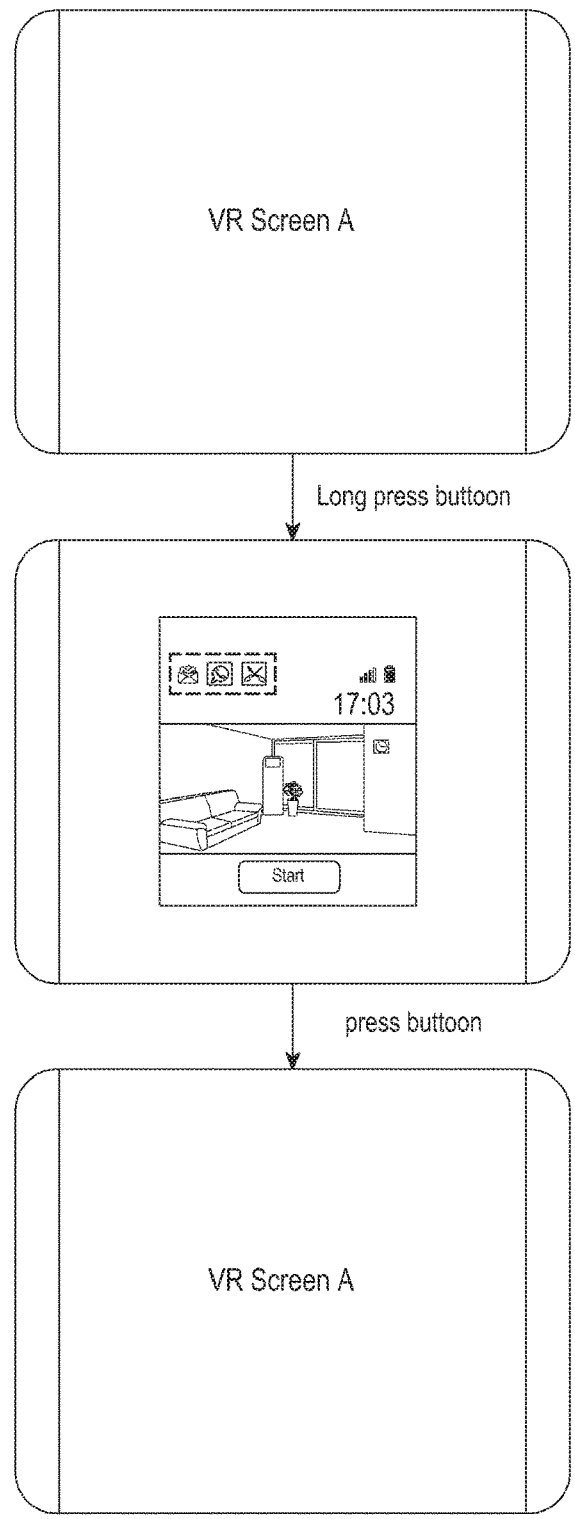
FIG. 22 is a view illustrating an example of a screen of displaying an event in a virtual reality mode according to an embodiment of the present invention.
Figure 23:
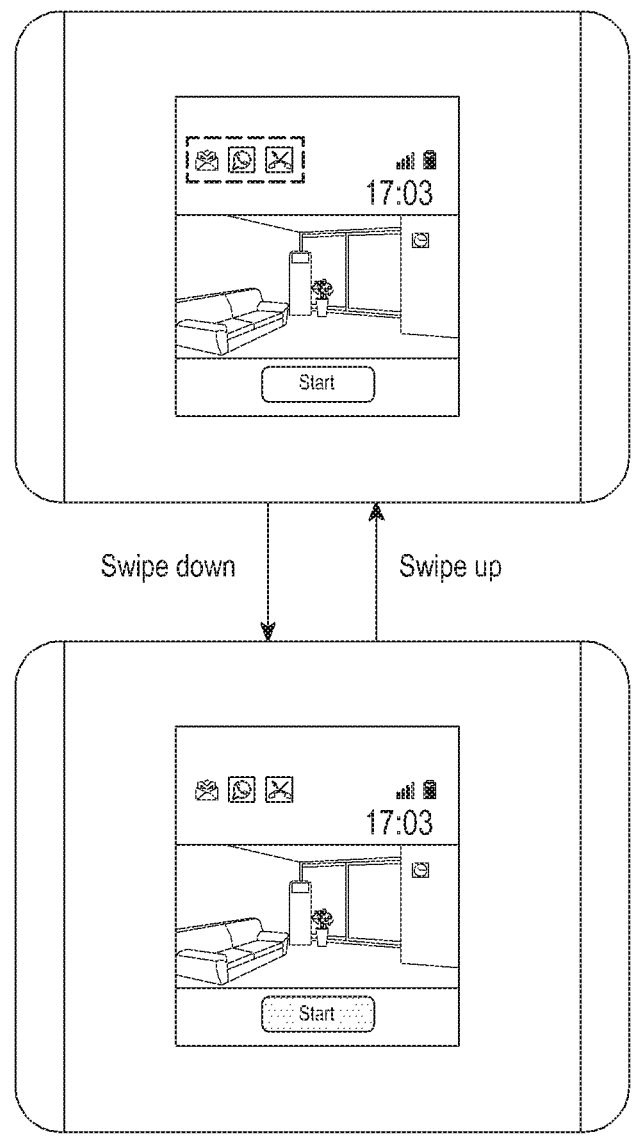
FIG. 23 is a view illustrating an example of a screen of displaying an event in a virtual reality mode according to an embodiment of the present invention.
Figure 24:
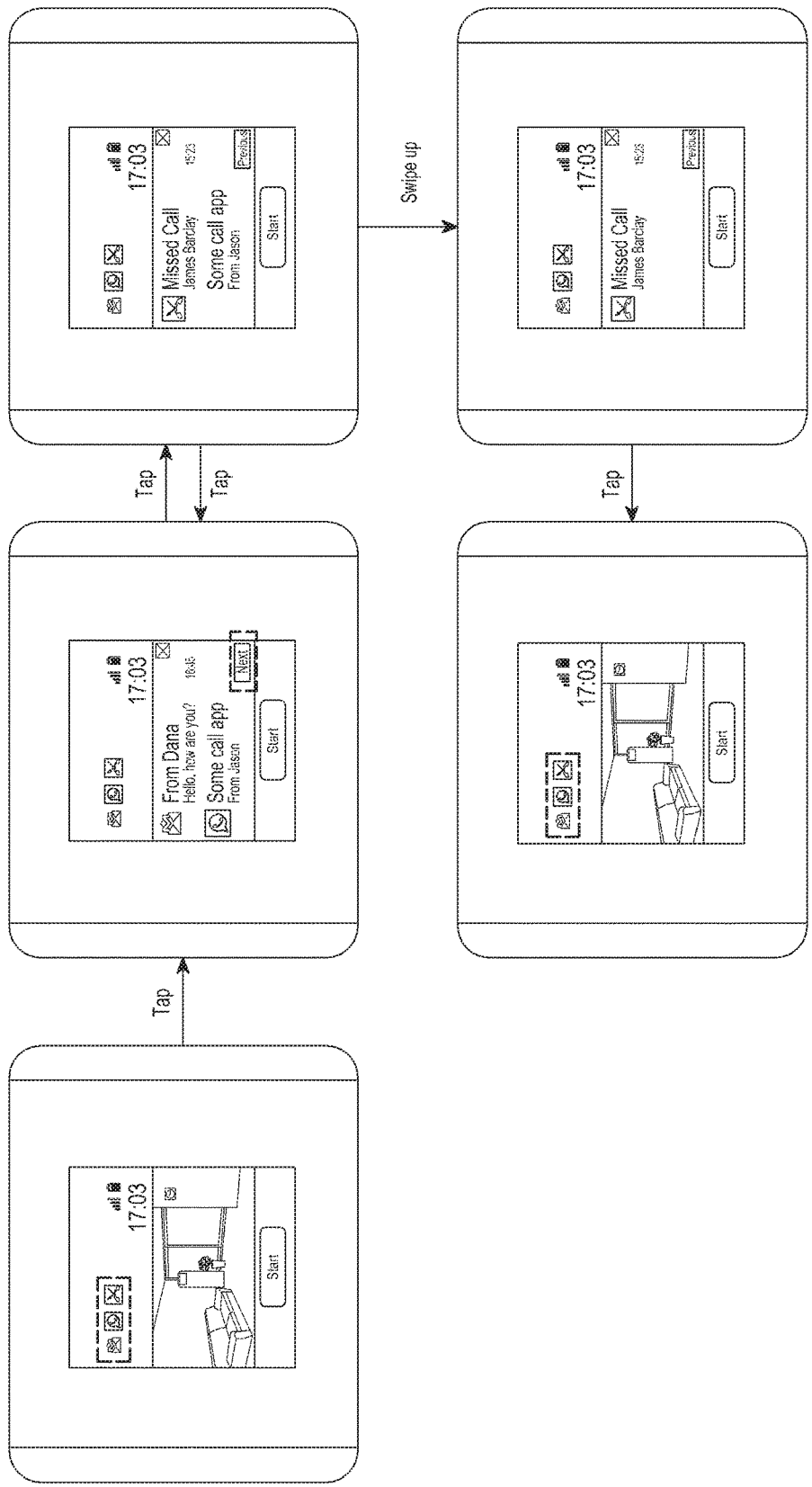
FIG. 24 is a view illustrating an example of a screen of displaying an event in a virtual reality mode according to an embodiment of the present invention.
Figure 25:
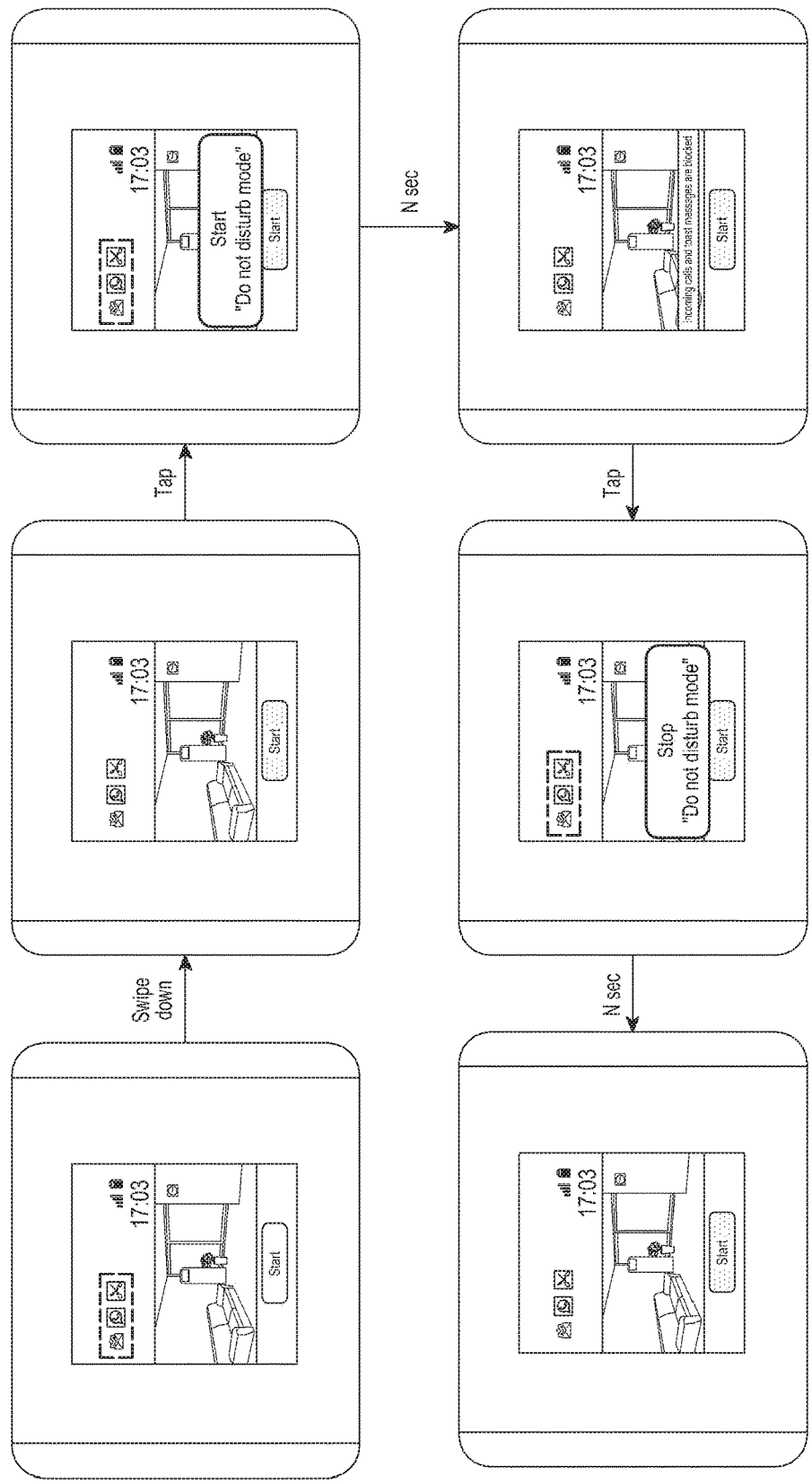
FIG. 25 is a view illustrating an example of a screen of displaying an event in a virtual reality mode according to an embodiment of the present invention.

Meanwhile, referring to FIG. 15, as the call is accepted or rejected on the event display screen shown in FIG. 13, the event-related information may be implemented in the virtual reality screen. As shown in FIG. 16, when the call is terminated, the event-related information may be implemented to disappear from the virtual reality screen.

FIGS. 17, 18, 19, 20, and 21 are views illustrating examples of representing information related to occurrence of an event (e.g., information related to a message, application, alarm, or Internet access) in various notification forms on the virtual reality screen, and FIGS. 22, 23, 24, and 25 are views illustrating examples of displaying information related to events in the virtual reality mode after switch into the see-through mode.

Figure 26:
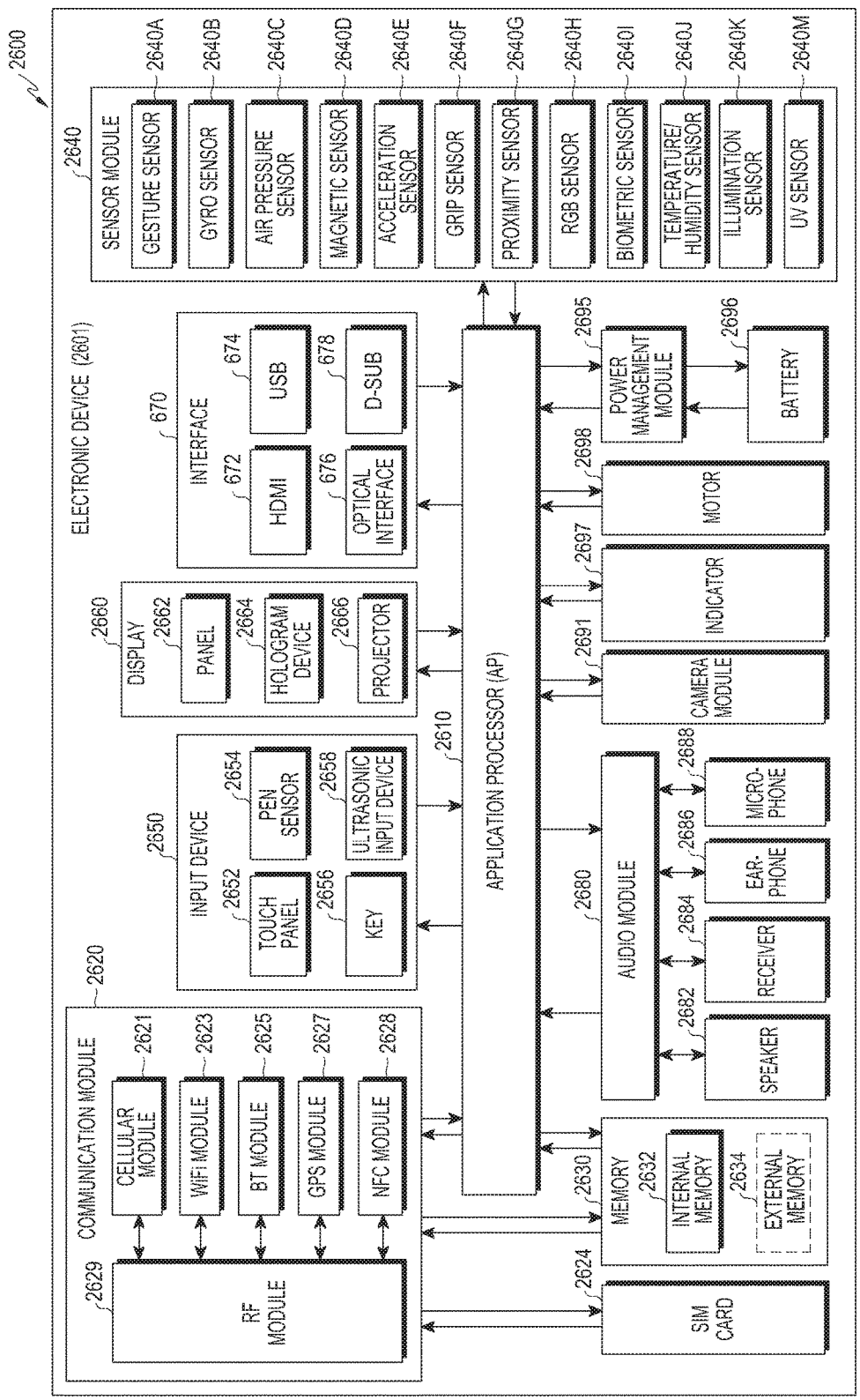
FIG. 26 is a block diagram illustrating a detailed structure of an electronic device according to an embodiment of the present invention.
Figure 27:
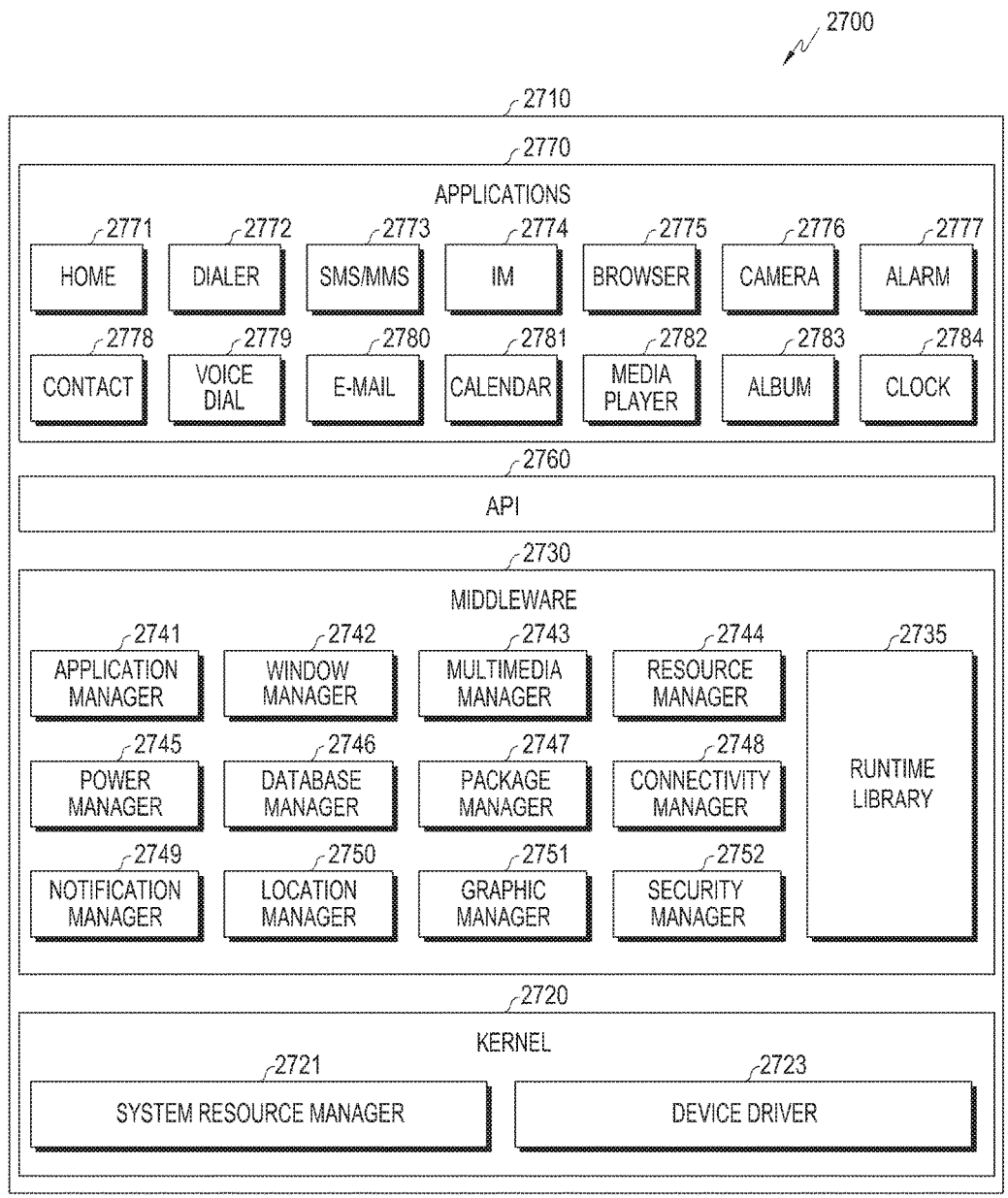
FIG. 27 is a block diagram illustrating a program module according to an embodiment of the present invention.
Figure 28:
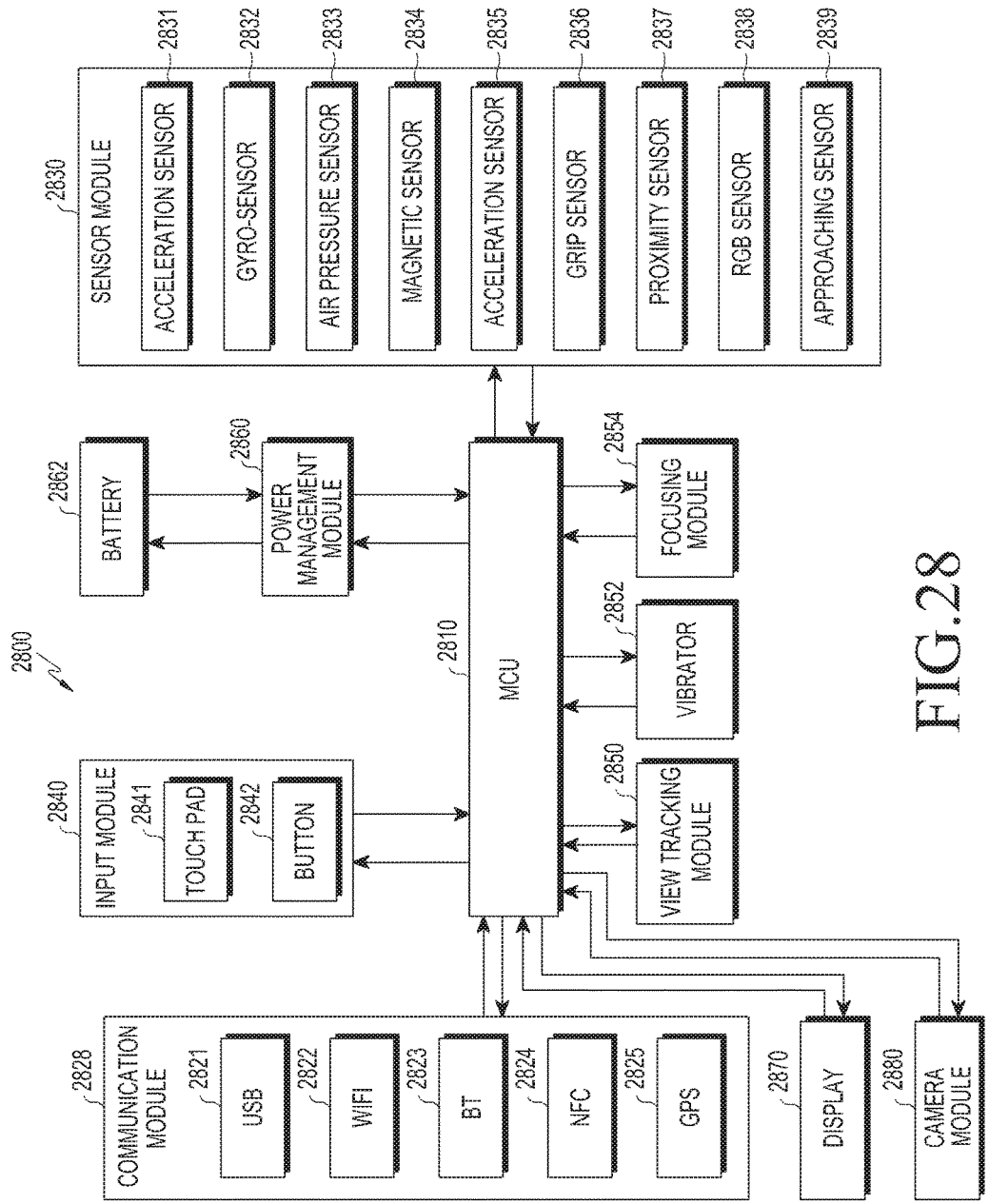
FIG. 28 is a block diagram illustrating a wearable device according to an embodiment of the present invention.

Hereinafter, examples of implementations of a first device (e.g., an electronic device) or a second device (a wearable device) are described with reference to FIGS. 26, 27, and 28. FIGS. 26 and 27 illustrate examples of implementing an electronic device functioning as a display apparatus, and FIG. 28 illustrates an example of implementing a wearable device.

FIG. 26 is a block diagram 2600 illustrating an electronic device 2601 according to an embodiment of the present invention. The electronic device 2601 may include the whole or part of the configuration of, e.g., the electronic device 101 shown in FIG. 1. The electronic device 2601 may include one or more application processors (APs) 2610, a communication module 2620, an SIM (subscriber identification module) card 2624, a memory 2630, a sensor module 2640, an input device 2650, a display 2660, an interface 2670, an audio module 2680, a camera module 2691, a power management module 2695, a battery 2696, an indicator 2697, and a motor 2698.

The AP 2610 may control multiple hardware and software components connected to the AP 2610 by running, e.g., an operating system or application programs, and the AP 932 may process and compute various data. The AP 2610 may be implemented in, e.g., a system on chip (SoC). According to an embodiment of the present disclosure, the AP 2610 may further include a graphic processing unit (GPU) and/or an image signal processor. The AP 2610 may include at least some (e.g., the cellular module 2621) of the components shown in FIG. 26. The AP 2610 may load a command or data received from at least one of other components (e.g., a non-volatile memory) on a volatile memory, process the command or data, and store various data in the non-volatile memory.

The communication module 2620 may have the same or similar configuration to the communication interface 170 of FIG. 1. The communication module 2620 may include, e.g., a cellular module 2621, a wireless fidelity (Wi-Fi) module 2623, a Bluetooth (BT) module 2625, a global positioning system (GPS) module 2627, a near-field communication (NFC) module 2628, and a radio frequency (RF) module 2629.

The cellular module 2621 may provide voice call, video call, text, or Internet services through a communication network (e.g., a long term evolution (LTE), LTE-advanced (LTE-A), code division multiple access (CDMA), wideband CDMA (WCDMA), universal mobile telecommunications system (UMTS), wireless broadcast (WiBro), or global system for mobile communications (GSM) network). According to an embodiment of the present invention, the cellular module 2621 may perform identification or authentication on the electronic device 2601 in the communication network using a subscriber identification module (e.g., the SIM card 2624). According to an embodiment of the present disclosure, the cellular module 2621 may perform at least some of the functions providable by the AP 2610. According to an embodiment of the present disclosure, the cellular module 2621 may include a communication processor (CP).

The WiFi module 2623, the BT module 2625, the GPS module 2627, or the NFC module 2628 may include a process for, e.g., processing data communicated through the module. At least some (e.g., two or more) of the cellular module 2621, the Wi-Fi module 2623, the BT module 2625, the GPS module 2627, and the NFC module 2628 may be included in a single integrated circuit (IC) or an IC package.

The RF module 2629 may communicate data, e.g., communication signals (e.g., RF signals). The RF module 2629 may include, e.g., a transceiver, a power amplifier module (PAM), a frequency filter, a low noise amplifier (LNA), or an antenna. According to an embodiment of the present invention, at least one of the cellular module 2621, the Wi-Fi module 2623, the BT module 2625, the GPS module 2627, or the NFC module 2628 may communicate RF signals through a separate RF module.

The SIM card 2624 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 2630 (e.g., the memory 130) may include, e.g., an internal memory 2632 or an external memory 2634. The internal memory 2632 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 2634 may include a flash drive, e.g., a compact flash (CF) memory, a secure digital (SD) memory, a micro-SD memory, a min-SD memory, an extreme digital (xD) memory, or a memory stick. The external memory 2634 may be functionally and/or physically connected with the electronic device 2601 via various interfaces.

For example, the sensor module 2640 may measure a physical quantity or detect an operational state of the electronic device 2601, and the sensor module 940 may convert the measured or detected information into an electrical signal. The sensor module 2640 may include at least one of, e.g., a gesture sensor 2640A, a gyro sensor 2640B, an air pressure sensor 2640C, a magnetic sensor 2640D, an acceleration sensor 2640E, a grip sensor 2640F, a proximity sensor 2640G, a color sensor 2640H such as a red-green-blue (RGB) sensor, a bio sensor 2640I, a temperature/humidity sensor 2640J, an illumination sensor 2640K, or an ultra violet (UV) sensor 2640M. Additionally or alternatively, the sensing module 2640 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 2640 may further include a control circuit for controlling at least one or more of the sensors included in the sensing module. According to an embodiment of the present disclosure, the electronic device 2601 may further include a processor configured to control the sensor module 2640 as part of an AP 2610 or separately from the AP 2610, and the electronic device 931 may control the sensor module 2640 while the AP is in a sleep mode.

The input unit 2650 may include, e.g., a touch panel 2652, a (digital) pen sensor 2654, a key 2656, or an ultrasonic input device 2658. The touch panel 2652 may use at least one of capacitive, resistive, infrared, or ultrasonic methods. The touch panel 2652 may further include a control circuit. The touch panel 2652 may further include a tactile layer and may provide a user with a tactile reaction.

The (digital) pen sensor 2654 may include, e.g., a part of a touch panel or a separate sheet for recognition. The key 2656 may include e.g., a physical button, optical key or key pad. The ultrasonic input device 2658 may use an input tool that generates an ultrasonic signal and enable the electronic device 2601 to identify data by sensing the ultrasonic signal to a microphone (e.g., a microphone 2688).

The display 2660 (e.g., the display 160) may include a panel 2662, a hologram device 2664, or a projector 2666. The panel 2662 may have the same or similar configuration to the display 160 of FIG. 1. The panel 2662 may be implemented to be flexible, transparent, or wearable. The panel 2662 may also be incorporated with the touch panel 2652 in a module. The hologram device 2664 may make three dimensional (3D) images (holograms) in the air by using light interference. The projector 2666 may display an image by projecting light onto a screen. The screen may be, for example, located inside or outside of the electronic device 2601. In accordance with an embodiment, the display 2660 may further include a control circuit to control the panel 2662, the hologram device 2664, or the projector 2666.

The interface 2670 may include e.g., a high definition multimedia Interface (HDMI) 2672, a USB 2674, an optical interface 2676, or a D-subminiature (D-sub) 2678. The interface 2670 may be included in e.g., the communication interface 170 shown in FIG. 1. Additionally or alternatively, the interface 2670 may include a Mobile High-definition Link (MHL) interface, a secure digital (SD) card/multimedia card (MMC) interface, or IrDA standard interface.

The audio module 2680 may convert a sound into an electric signal or vice versa, for example. At least a part of the audio module 2680 may be included in e.g., the input/output interface 150 as shown in FIG. 1. The audio module 2680 may process sound information input or output through e.g., a speaker 2682, a receiver 2684, an earphone 2686, or a microphone 2688.

For example, the camera module 2691 may be a device for capturing still images and videos, and may include, according to an embodiment of the present disclosure, one or more image sensors (e.g., front and back sensors), a lens, an Image Signal Processor (ISP), or a flash such as a light emitting diode (LED) or xenon lamp.

The power manager module 2695 may manage power of the electronic device 2601, for example. Although not shown, according to an embodiment of the present disclosure, the power manager module 2695 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 2696, a voltage, a current, or a temperature while the battery 2696 is being charged. The battery 2696 may include, e.g., a rechargeable battery or a solar battery.

The indicator 2697 may indicate a particular state of the electronic device 2601 or a part of the electronic device (e.g., the AP 2610), including e.g., a booting state, a message state, or recharging state. The motor 2698 may convert an electric signal to a mechanical vibration and may generate a vibrational or haptic effect. Although not shown, a processing unit for supporting mobile TV, such as a GPU may be included in the electronic device 2601. The processing unit for supporting mobile TV may process media data conforming to a standard for Digital Multimedia Broadcasting (DMB), Digital Video Broadcasting (DVB), or mediaFLO.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

FIG. 27 is a block diagram 2700 illustrating a program module 2710 according to an embodiment of the present disclosure. According to an embodiment of the present invention, the program module 2710 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 2710 may include, e.g., a kernel 2720, middleware 2730, an application programming interface (API) 2760, and/or an application 2770. At least a part of the program module 2710 may be preloaded on the electronic device or may be downloaded from a server (e.g., the server 106).

The kernel 2720 (e.g., the kernel 141 of FIG. 1) may include, e.g., a system resource manager 2721 or a device driver 2723. The system resource manager 2721 may perform control, allocation, or recovery of system resources. According to an embodiment of the present disclosure, the system resource manager 2721 may include a process managing unit, a memory managing unit, or a file system managing unit. The device driver 2723 may include, e.g., a display driver, a camera driver, a Bluetooth driver, a shared memory driver, a USB driver, a keypad driver, a WiFi driver, an audio driver, or an inter-process communication (IPC) driver.

The middleware 2730 may provide various functions to the application 2770 through the API 2760 so that the application 2770 may efficiently use limited system resources in the electronic device or provide functions jointly required by applications 2770. According to an embodiment of the present invention, the middleware 2730 (e.g., the middleware 143) may include at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, or a security manager 2752.

The runtime library 2735 may include a library module used by a compiler in order to add a new function through a programming language while, e.g., the application 2770 is being executed. The runtime library 2735 may perform input/output management, memory management, or operation on arithmetic functions.

The application manager 2741 may manage the life cycle of at least one application of, e.g., the applications 2770. The window manager 2742 may manage GUI resources used on the screen. The multimedia manager 2743 may grasp formats necessary to play various media files and use a codec appropriate for a format to perform encoding or decoding on media files. The resource manager 2744 may manage resources, such as source code of at least one of the applications 2770, memory or storage space.

The power manager 2745 may operate together with, e.g., a basic input/output system (BIOS) to manage battery or power and provide power information necessary for operating the electronic device. The database manager 2746 may generate, search, or vary a database to be used in at least one of the applications 2770. The package manager 2747 may manage installation or update of an application that is distributed in the form of a package file.

The connectivity manager 2748 may manage wireless connectivity, such as, e.g., Wi-Fi or Bluetooth. The notification manager 2749 may display or notify an event, such as a coming message, appointment, or proximity notification, of the user without interfering with the user. The location manager 2750 may manage locational information on the electronic device. The graphic manager 2751 may manage graphic effects to be offered to the user and their related user interface. The security manager 2752 may provide various security functions necessary for system security or user authentication. According to an embodiment of the present disclosure, when the electronic device (e.g., the electronic device 101) has telephony capability, the middleware 2730 may further include a telephony manager for managing voice call or video call functions of the electronic device.

The middleware 2730 may include a middleware module forming a combination of various functions of the above-described components. The middleware 2730 may provide a specified module per type of the operating system in order to provide a differentiated function. Further, the middleware 2730 may dynamically omit some existing components or add new components.

The API 2760 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 2770 (e.g., the application processor 147) may include one or more applications that may provide functions such as, e.g., a home 2771, a dialer 2772, a short message service (SMS)/multimedia messaging service (MMS) 2773, an instant message (IM) 2774, a browser 2775, a camera 2776, an alarm 2777, a contact 2778, a voice dial 2779, an email 2780, a calendar 2781, a media player 2782, an album 2783, or a clock 2784, a health-care (e.g., measuring the degree of workout or blood sugar), or provision of environmental information (e.g., provision of air pressure, moisture, or temperature information).

According to an embodiment of the present disclosure, the application 2770 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user. The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present invention, the application 2770 may include an application (e.g., a healthcare application) designated depending on the attribute (e.g., as an attribute of the electronic device, the type of electronic device is a mobile medical device) of the external electronic device (e.g., the electronic devices 102 and 104). According to an embodiment of the present invention, the application 2770 may include an application received from the external electronic device (e.g., the server 106 or electronic devices 102 and 104). According to an embodiment of the present invention, the application 2770 may include a preloaded application or a third party application downloadable from a server. The names of the components of the program module 2710 according to the shown embodiment may be varied depending on the type of operating system.

According to an embodiment of the present disclosure, at least a part of the program module 2710 may be implemented in software, firmware, hardware, or in a combination of two or more thereof. At least a part of the programming module 2710 may be implemented (e.g., executed) by e.g., a processor (e.g., the AP 2610). At least a part of the program module 2710 may include e.g., a module, program, routine, set of instructions, process, or the like for performing one or more functions.

FIG. 28 is a block diagram illustrating an electronic device 2800 according to an embodiment of the present invention.

Referring to FIG. 28, the wearable device 2800 may provide the user with the same or similar operations to those provided by the above-described electronic device independently from the display apparatus mounted thereto. The wearable device 2800 may include an MCU 2810, a communication module 2820, a sensor module 2830, an input module 2840, a view tracking module 2850, a vibrator 2852, a focusing module 2854, a power management module 2860, a battery 2862, a display 2870, and a camera 2880.

The communication module 2820 may include, e.g., a USB module 2821, a Wi-Fi module 2821, a BT module 2822, an NFC module 2824, and a GPS module 2825.

The sensor module 2830 may include at least one of, e.g., an acceleration sensor 2831, a gyro sensor 2832, a geomagnetic sensor 2833, a magnetic sensor 2834, a proximity sensor 2835, a gesture sensor 2836, a grip sensor 2837, a bio sensor 2838, and an approaching sensor 2839.

The input module 2840 may include a touch pad 2841 and a button 2842.

The wearable device 2800, rather than having a structure in which an electronic device (e.g., a display apparatus) is detachably coupled, may include the display 2870 that may be installed in the body in a fixed manner. The display 2870 may be installed to provide the user with a screen through the lenses shown in FIGS. 5 and 6 instead of the display of the electronic device mounted thereto. The display 2870 may display a screen according to an augmented reality operation or see-through operation according to an embodiment of the present invention. The camera 2880 may be installed, e.g., at the front of the body to take an image of a front side of the wearer.

The wearable device 2800 may provide the wearer with the same or similar augmented reality operation and see-through operation to that provided by the electronic device independently from the electronic device mounted thereto.

The term 'module' or 'functional unit' may refer to a unit including one of hardware, software, and firmware, or a combination thereof. The term 'module' or 'functional unit' may be interchangeably used with a unit, logic, logical block, component, or circuit. The term 'module' or 'functional unit' may be a minimum unit or part of an integrated component. The 'module' may be a minimum unit or part of performing one or more functions. The 'module' or 'functional unit' may be implemented mechanically or electronically. For example, the 'module' or 'functional unit' may include at least one of application specific integrated circuit (ASIC) chips, field programmable gate arrays (FPGAs), or programmable logic arrays (PLAs) that perform some operations, which have already been known or will be developed in the future.

According to an embodiment of the present invention, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present invention, a storage medium may store instructions configured to, when executed by at least one processor, enable the at least one processor to perform at least one operation that may include running a virtual reality mode on an electronic device, detecting an interrupt according to occurrence of at least one event, varying event-related information related to the event in a form corresponding to the virtual reality mode, and displaying the varied event-related information on a screen run corresponding to the virtual reality mode.

The embodiments herein are provided merely for better understanding of the present invention, and the present invention should not be limited thereto or thereby. It should be appreciated by one of ordinary skill in the art that various changes in form or detail may be made to the embodiments without departing from the scope of the present invention defined by the following claims.

The invention claimed is:

1. An electronic device, comprising:
a display;
a memory; and
at least one processor configured to:
control the display to display a screen in a virtual reality mode, wherein two screen images corresponding to a user's eyes are displayed on the screen in response to operating in the virtual reality mode,
determine an occurrence of at least one event related to an execution of at least one application while the screen is displayed in a virtual reality mode,
control the execution of the at least one application to be blocked, in response to determining the occurrence of the at least one event,
control the display to display event-related information representing the occurrence of the at least one event on the screen displayed in the virtual reality mode when the at least one event is an event to be displayed in the virtual reality mode, and
control the memory to store the event-related information when the at least one event is not the event to be displayed in the virtual reality mode,
wherein the at least one processor is further configured to display the event-related information stored in the storage when the electronic device switches from the virtual reality mode into a see-through mode.

2. The electronic device of claim 1, wherein the event includes any one or more selected from among a call reception event, a message reception event, an alarm notification, a scheduler notification, a wireless fidelity (Wi-Fi) connection, a Wi-Fi disconnection, a low battery notification, a data permission or use restriction notification, a no application response notification, or an abnormal application termination notification.

3. The electronic device of claim 1, wherein the at least one processor is further configured to control the memory to store information regarding at least one event to be displayed in the virtual reality mode.

4. The electronic device of claim 1, wherein the event includes an instant message reception notification event.

5. The electronic device of claim 1, wherein the at least one processor is further configured to run the at least one blocked application when a screen mode of the electronic device switches from the virtual reality mode into a see-through mode.

6. The electronic device of claim 1, wherein when the event is an event related to running an application, the at least one processor is further configured to allow the application according to the occurrence of the at least one event to be run on a background of a screen of the virtual reality mode.

7. The electronic device of claim 1, wherein when the electronic device is connected with a wearable device, the at least one processor is further configured to run the virtual reality mode.

8. The electronic device of claim 1, wherein the at least one processor is further configured to allow the event-related information to be arranged and processed to be displayed in a three-dimensional (3D) space of the virtual reality mode screen being displayed on a current screen.

9. A method for improving virtual reality performance of an electronic device, including displaying an event in a virtual reality mode, the method comprising:
- displaying, using a display of the electronic device, a screen in the virtual reality mode, wherein two screen images corresponding to a user's eyes are displayed on the screen in response to operating in the virtual reality mode;
- determining, using at least one processor of the electronic device, an occurrence of at least one event related to an execution of at least one application while the screen is displayed in a virtual reality mode;
- controlling, using the at least one processor, the execution of the at least one application to be blocked, in response to determining the occurrence of the at least one event; and
- displaying, using the display, event-related information representing the occurrence of the at least one event on the screen displayed in the virtual reality mode when the at least one event is an event to be displayed in the virtual reality mode;
- storing the event-related information when the at least one event is not the event to be displayed in the virtual reality mode; and
- when a screen mode of the electronic device switches from the virtual reality mode into a see-through mode, displaying the stored event-related information on a screen.

10. The method of claim 9, wherein the event includes any one or more selected from among a call reception event, a message reception event, an alarm notification, a scheduler notification, a wireless fidelity (Wi-Fi) connection, a Wi-Fi disconnection, a low battery notification, a data permission or use restriction notification, a no application response notification, or an abnormal application termination notification.

11. The method of claim 9, further comprising storing, using the memory, information regarding at least one event to be displayed in the virtual reality mode.

12. The method of claim 9, wherein the stored event-related information to be displayed includes an instant message reception notification event.

13. The method of claim 9, further comprising, when a screen mode of the electronic device switches from the virtual reality mode into a see-through mode, running the at least one blocked application.

14. The method of claim 9, further comprising, when the event is an event related to running an application, performing control to allow the application according to the occurrence of the at least one event to be run on a background of a screen of the virtual reality mode.

15. The method of claim 9, wherein when the electronic device is connected with a wearable device, the virtual reality mode is run.

16. The method of claim 9, wherein processing the event-related information includes arranging the event-related information to be displayed in a 3D space of the virtual reality mode screen being displayed on a current screen.

* * * * *